(12) United States Patent
Abzarian et al.

(10) Patent No.: US 8,977,865 B2
(45) Date of Patent: Mar. 10, 2015

(54) DATA ENCRYPTION CONVERSION FOR INDEPENDENT AGENTS

(75) Inventors: David Abzarian, Kirkland, WA (US); Darren Glen Moss, Redmond, WA (US); Grigory Borisovich Lyakhovitskiy, Bothell, WA (US); Karan Mehra, Sammamish, WA (US); Innokentiy Basmov, Redmond, WA (US); Octavian T. Ureche, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 755 days.

(21) Appl. No.: 12/786,550

(22) Filed: May 25, 2010

(65) Prior Publication Data

US 2011/0296238 A1 Dec. 1, 2011

(51) Int. Cl.
*G06F 21/00* (2013.01)
*G06F 21/78* (2013.01)
*G06F 21/72* (2013.01)
*G06F 21/85* (2013.01)
*H04L 9/08* (2006.01)

(52) U.S. Cl.
CPC .............. *G06F 21/78* (2013.01); *G06F 21/72* (2013.01); *G06F 21/85* (2013.01); *H04L 9/0891* (2013.01); *H04L 9/0894* (2013.01); *H04L 2209/12* (2013.01); *G06F 2221/2107* (2013.01)
USPC .............................. 713/193; 713/189; 380/37

(58) Field of Classification Search
CPC .......... G06F 12/14; G06F 21/10; G06F 21/60
USPC ..................................... 713/193, 189; 380/37
See application file for complete search history.

(56) References Cited

U.S. PATENT DOCUMENTS 5,727,062 A * 3/1998 Ritter .............................. 380/37
6,738,905 B1 5/2004 Kravitz et al.
6,986,043 B2 1/2006 Andrew et al.

(Continued)

OTHER PUBLICATIONS

"A Guide to Reducing the Risk of Costly Data Breaches: The 3 Pillars of Data Protection", Retrieved at << http://www.ironmountain.com/resources/pcprotect/pillars_wp.pdf >>, Iron Mountain White Paper, Jun. 2006, pp. 18.

(Continued)

*Primary Examiner* — Brandon Hoffman
*Assistant Examiner* — Thong Truong
(74) *Attorney, Agent, or Firm* — Timothy Churna; Kate Drakos; Micky Minhas

(57) ABSTRACT

The re-encryption of data can be performed with independent cryptographic agents that can automatically encrypt and decrypt data in accordance with cryptographic regions, such that data within a single cryptographic region is encrypted and decrypted with the same cryptographic key. An "in-place" re-encryption can be performed by reading data from a chunk in an existing cryptographic region, shrinking the existing cryptographic region past the chunk, expanding a replacement cryptographic region over the chunk, and then writing the data back to the same location, which is now part of the replacement cryptographic region. An "out-of-place" re-encryption can be performed by reading data from a chunk in an existing cryptographic region and then writing the data back to a location immediately adjacent that is part of a replacement cryptographic region. After the re-encrypted data is "shifted", the cryptographic regions can be expanded and contracted appropriately, and another chunk can be selected.

20 Claims, 19 Drawing Sheets

(56) References Cited

U.S. PATENT DOCUMENTS

| | | | |
|---|---|---|---|
| 7,178,168 B2* | 2/2007 | Gammel et al. | 380/262 |
| 7,240,220 B2* | 7/2007 | Osaki | 713/193 |
| 7,657,756 B2 | 2/2010 | Hall | |
| 8,140,864 B2* | 3/2012 | Osaki | 713/193 |
| 2008/0059794 A1 | 3/2008 | Nagappa et al. | |
| 2008/0260159 A1* | 10/2008 | Osaki | 380/277 |
| 2008/0320263 A1* | 12/2008 | Nemiroff et al. | 711/164 |
| 2010/0031056 A1 | 2/2010 | Harada | |

OTHER PUBLICATIONS

"BitLocker Drive Encryption Overview", Retrieved at << http://technet.microsoft.com/en-us/library/cc732774.aspx >>, Retrieved Date: Feb. 25, 2010, pp. 5.

* cited by examiner

*(in-place, offline, not fault tolerant)*

*(in-place, offline, fault tolerant)*

*(in-place, offline, fault tolerant – digest optimized)*

*(in-place, online, not fault tolerant)*

*(in-place, online, fault tolerant)*

*(in-place, online, fault tolerant – clearing optimized)*

(in-place, online, fault tolerant – digest optimized)

*(out-of-place, offline)*

*(out-of-place, online)*

DATA ENCRYPTION CONVERSION FOR INDEPENDENT AGENTS

BACKGROUND

Traditionally, computer readable data is typically stored by data storage hardware devices, such as hard disk drives, that comprise computer readable media on which the computer readable data is stored. To prevent unauthorized access of data, especially in situations where physical access to the data storage hardware is gained, such as through theft or loss, the concept of "full volume encryption" was developed whereby data belonging to a data volume was stored in an encrypted manner. Since full volume encryption was applied to substantially all of the data in a data volume, it provided greater protection than individual file encryption technologies that were utilized previously. Consequently, even if a data storage device were to be stolen and communicationally coupled to a computing device devoid of executable instructions that would prevent the unauthorized access of data from the data storage device, the data could, nevertheless, remain protected, since it would be physically stored in an encrypted manner.

To increase the efficiency of such full volume encryption, the task of encrypting and decrypting data can be performed by hardware associated with the storage device itself, instead of by the central processing unit of the host computing device. Alternatively, the encrypting and decrypting of data as well as control of the encryption conversion can be performed by intermediate elements which may, or may not be, part of the storage device, and, likewise, may, or may not, be part of the central processing unit of the host computing device. In either case, such devices would still cause the storage device to appear, to higher level components, such as the operating system or application software, as a traditional storage device. However, upon receiving data for storage, the data can be automatically encrypted prior to being stored on the storage medium and, similarly, when reading data, the data can first be decrypted before it is provided to higher level components.

Typically, storage devices that comprise hardware cryptographic support, or are communicationally coupled to an intermediate cryptographic element, utilize a single cryptographic key to encrypt and decrypt all, or substantially all, of the data that is stored in a particular range of storage locations, or "addresses", and another, different, cryptographic key to encrypt and decrypt data that is stored in a different range of storage addresses. The range of addresses which comprise data encrypted by a single key is traditionally called a "band" or "region", and the bands or regions of such a storage device are typically configured by the computing device to which the storage device is communicationally coupled.

SUMMARY

In many instances, it can be advantageous, from a security perspective, to change the cryptographic key, the cryptographic algorithm, or both, that was utilized to encrypt, and subsequently decrypt, data stored on a storage medium. Typically, such instances are associated with situations where the cryptographic key, or another cryptographic key protecting it, have been inadvertently disclosed, or are otherwise viewed to no longer be secret. That changing of the cryptographic key that was utilized to encrypt and decrypt data comprises re-encrypting the data utilizing the new cryptographic key.

In one embodiment, encrypted data stored in an "existing" encryption region associated with an "existing" cryptographic key can be read and then subsequently written to a different "replacement" encryption region associated with a "replacement" cryptographic key that differs from the existing key and, thereby, affects a change of the cryptographic key utilized to protect the data. A chunk of data from the existing encryption region can be read and written to the replacement encryption region, which can be adjacent to the existing encryption region. The existing encryption region can then be contracted to exclude the addresses of the chunk of data, and the replacement encryption region can be subsequently expanded to include the addresses of the chunk of data. Such a process can then be repeated for each chunk of data in the existing encryption region, with each chunk of data being written into the replacement encryption region, in the location of the previously operated-upon chunk, thereby resulting in a "shift" of the data once the re-encryption is complete.

In another embodiment, a chunk of data from the existing encryption region can be read and maintained in memory while the existing encryption region is contracted to exclude the addresses of the chunk of data, and the replacement encryption region is subsequently expanded to include the addresses of the chunk of data. The data retained in memory can then be written back to the same location which, now, can be part of the replacement encryption region and, consequently, the data, when written back, can be encrypted with the replacement cryptographic key. Such a process can, likewise, be repeated for each chunk of data in the existing encryption region, except that, since the data is written back to the same location, there is no "shift" as a result of the re-encryption.

In a further embodiment, the re-encryption can be performed while the storage device comprising the data being re-encrypted remains "online" and accessible to one or more computing devices to which it is communicationally coupled. In such a further embodiment, the reading of data and the writing of data directed to the specific chunk of data currently being re-encrypted can be held until such a re-encryption is completed. Alternatively, only the writing of data can be held, while the reading of data can be redirected, such as to an in-memory copy or a redundant copy made for fault-tolerance purposes.

In a still further embodiment, re-encryption that stores the re-encrypted data back in the same location can be made fault-tolerant via the use of a logging location to which a copy of the chunk of data being re-encrypted can be copied prior to the contraction of the existing cryptographic region. Prior to commencement of the re-encryption of a subsequent chunk of data, the logging location can be cleared to avoid subsequent confusion in the event of a fault. Additionally, known mechanisms, such as write-through or flush cache semantics, can be utilized to ensure that data written to the logging location is retained in a non-volatile manner.

In yet further embodiments, the step of clearing the logging location can be skipped if the writing of data to a re-encrypted chunk is held until the data from a subsequent chunk to be re-encrypted is copied to the logging location. Also, rather than copying the data from a chunk that is being re-encrypted to the logging location, digests of sectors of the chunk being re-encrypted can be computed and stored in the logging location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
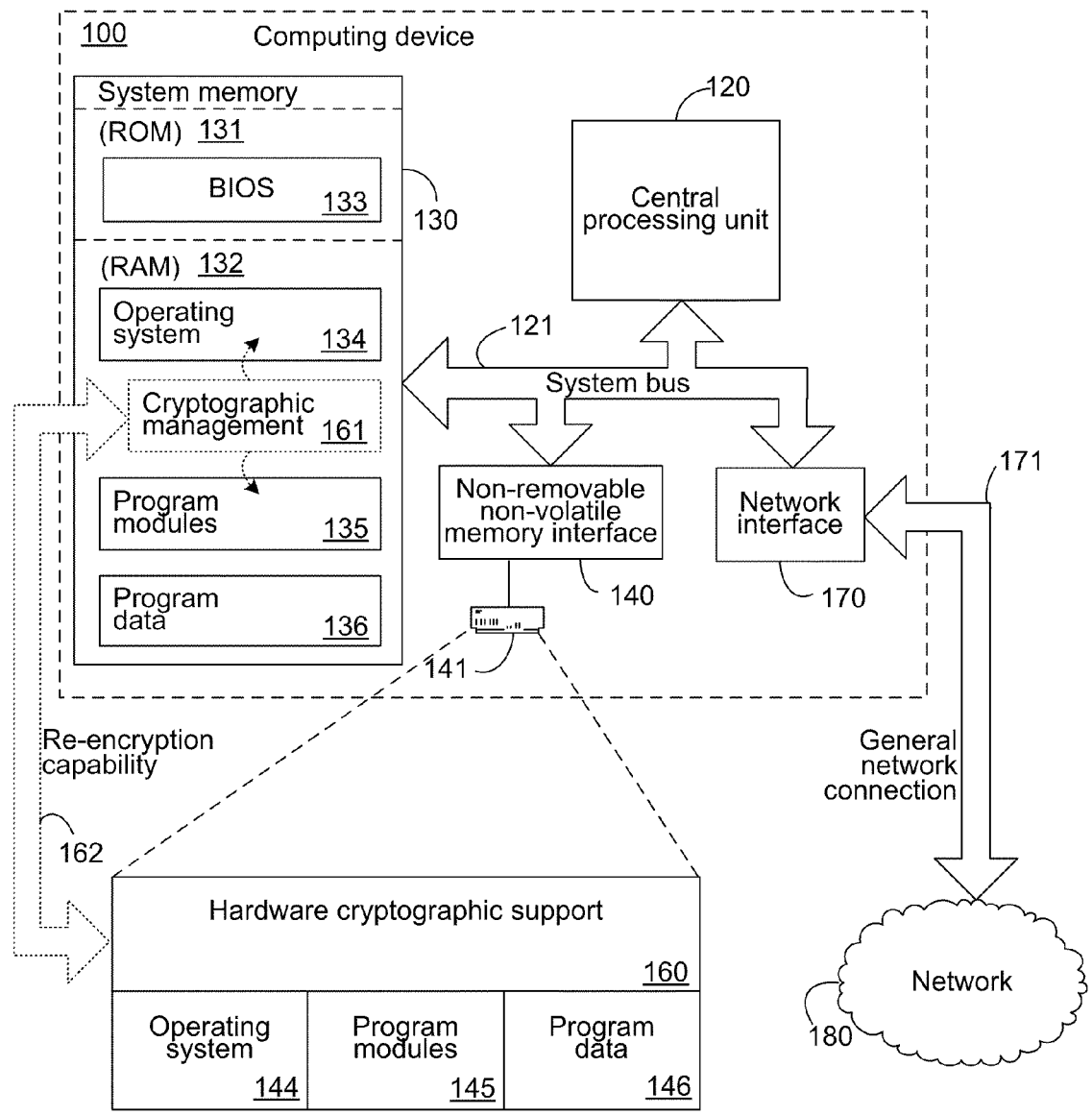
FIG. 1 is a block diagram of an exemplary computing device with a hardware encrypting storage device.

The following description relates to re-encryption mechanisms that can utilize and take advantage of independent cryptographic agents to perform the cryptographic operations. The re-encryption of data can be performed "in-place", such that the re-encrypted data is stored in the same "location", such as, for example, as determined by storage addresses, as the prior encrypted data. Alternatively, the re-encryption of data can be performed "out-of-place", such that the re-encrypted data is "shifted", or stored in locations adjacent to the locations in which the prior encrypted data was stored. The re-encryption of data can be performed "online", such that the overall collection of data being re-encrypted, such as, for example, a data volume, remains accessible to the computer-executable instructions executing on one or more computing devices communicationally coupled to the storage device on which the data are stored. Alternatively, the re-encryption of data can be performed "offline", such that the data are not accessible to the computer-executable instructions executing on one or more computing devices communicationally coupled to the storage device on which the data are stored. For the in-place re-encryption of data, fault-tolerance can be achieved through the optional copying of the chunk of data being re-encrypted to a logging location from which it can be recovered in the case of one or more fault. Optionally, rather than copying the data itself, digests can be computed, such as via known functions, and stored in the logging location. Also optionally, the data in the logging location need not be explicitly cleared if changes to the immediately prior chunk of data that has already been re-encrypted are held off until the current chunk of data that is being re-encrypted is fully copied to the logging location.

The techniques described herein focus on, but are not limited to, the utilization of hardware-based encryption mechanisms that are part of certain types of storage devices, referred to herein as "hardware encrypting storage devices". The below described mechanisms are applicable to any type of independent encryption agent that is independent of the computer-executable instructions implementing the below described mechanisms. Consequently, hardware devices that provide pass-through cryptographic support that can be communicationally coupled between a computing device and a storage device, and software elements, comprised of computer-executable instructions, that can provide pass-through cryptographic support for data being stored on, and read from, a storage device communicationally coupled to a computing device are equally utilizable by the below described mechanisms. As such, references below to hardware encrypting storage devices, or the hardware cryptographic support provided thereby, are meant to be understood as being equally applicable to any other independent cryptographic agents.

Additionally, although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary computing device 100 is illustrated that can include, but is not limited to, one or more central processing units (CPUs) 120, a system memory 130 and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and the other components illustrated can be physically co-located, such as on a single chip. In such a case, some or all of the system bus 121 can be nothing more than silicon pathways within a single chip structure and its illustration in FIG. 1 can be nothing more than notational convenience for the purpose of illustration.

In addition to the elements described above, the computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates an operating system 134, other program modules 135, and program data 136.

The computing device 100 may also include other removable/non-removable, volatile/nonvolatile computer storage media. For example, FIG. 1 illustrates a hard disk drive 141 that reads from or writes to non-removable (from the hard disk drive itself), non-volatile magnetic media and provides hardware cryptographic support 160, such that the hard disk drive 141 itself can, for example, encrypt data provided to it by other components of the computing device 100, such as the CPU 120. Other removable/non-removable, volatile/nonvolatile computer storage media that can be used with the exemplary computing device include, but are not limited to, magnetic tape cassettes, flash memory cards, solid state storage devices (SSDs), digital versatile disks, digital video tape, solid state RAM, solid state ROM, and the like. The hard disk drive 141, or any of these other removable/non-removable, volatile/nonvolatile computer storage media, are typically connected to the system bus 121 through a non-removable, non-volatile memory interface such as interface 140. For ease of illustration and reference, the below descriptions are provided within the context of the illustrated hardware encrypting hard disk drive 141 illustrated in FIG. 1. However, as will be clear to those skilled in the art, none of the below described mechanisms are limited to the magnetic media of the hard disk drive 141 and can be equally implemented on any type of computer storage media, including any of the removable/non-removable, volatile/nonvolatile computer storage media enumerated above.

Although not specifically illustrated in FIG. 1, the hardware cryptographic support 160 of a hardware encrypting storage device, such as the hardware encrypting hard disk drive 141, can comprise a dedicated processor and/or memory for performing cryptographic functions, such as the encryption or decryption of data provided to the hard disk drive or read by the hard disk drive from its storage media. Such encryption and decryption can be performed with reference to one or more cryptographic keys often referred to as "drive media keys" that can be maintained by the hardware cryptographic support 160. The drive media keys can themselves be protected by one or more other keys, such as in a well known key layering protection scheme in which one key at one level protects another key at a lower level. Typically, a single drive media key is utilized to encrypt and decrypt all of the data stored in, and read from, a range of addresses or storage locations on the hard disk drive 141. One common implementation of addressing storage locations is known as "Logical Block Addressing". Such a range of addresses or storage locations is often referred to as a "band" or "encryption region" and a single storage device can have multiple such "bands" or "encryption regions", with multiple drive media keys corresponding to those bands or encryption regions. Thus, while the computer-executable instructions executing on the computing device 100 may not, themselves, specifically perform the encryption and decryption of the data that is stored on, and read from, the hard disk drive 141, they can control aspects of such encryption and decryption via the creation, modification and deletion of bands or encryption regions on the hard disk drive 141, as there exists a one-to-one correspondence between such encryption regions and the drive media keys utilized to protect the data.

The drives and their associated computer storage media discussed above and illustrated in FIG. 1, provide storage of computer readable instructions, data structures, program modules and other data for the computing device 100. For example, the hardware encrypting hard disk drive 141 is illustrated as storing an operating system 144, other program modules 145, and program data 146, which can comprise both data created for the program modules 145 to utilize as part of their execution and data created by a user, of the computing device 100, by utilizing the program modules 145. Note that these components can either be the same as or different from operating system 134, other program modules 135 and program data 136. Operating system 144, other program modules 145 and program data 146 are given different numbers here to illustrate that, at a minimum, they are different copies.

Either or both of the operating system 134 and program modules 135 can comprise computer-executable instructions for performing cryptographic management 161, such as in the manner described in detail below. In particular, as will be described below, such cryptographic management 161 can interoperate with, for example, the hardware cryptographic support 160 of the hardware encrypting storage device to implement the below described re-encryption capability 162.

The computing device 100 may operate in a networked environment using logical connections to one or more remote computers. For simplicity of illustration, the computing device 100 is shown in FIG. 1 to be connected to a network 180 that is not limited to any particular network or networking protocols. The logical connection depicted in FIG. 1 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 2:
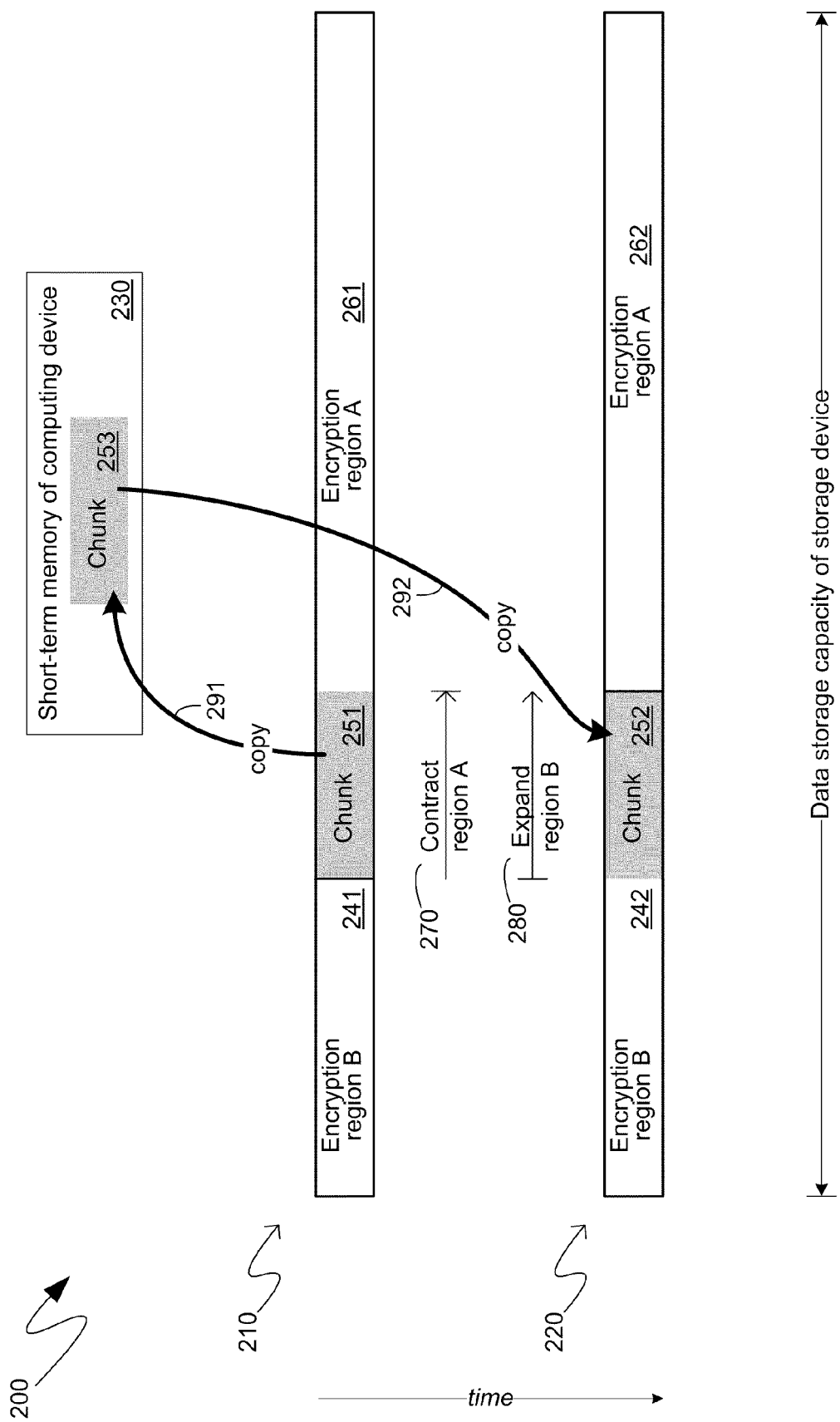
FIG. 2 is a block diagram of an exemplary offline, in-place re-encryption of data.

Turning to FIG. 2, the system 200 shown therein illustrates an exemplary sequence of steps by which data can be re-encrypted while taking advantage of independent cryptographic agents, such as, for example, the hardware cryptographic support 160 of the hardware encrypting hard disk drive 141 shown in FIG. 1. As indicated in FIG. 2, the data storage capacity of the storage device being utilized for such re-encryption is illustrated at one given point in time by the configuration 210, and is illustrated at a subsequent point in time by the configuration 220. In between such points in time actions 270 and 280 can occur, where the temporal relationship between the configurations 210 and 220 and the actions 270 and 280 is signified by the presence of the "time arrow" on the left-hand side of FIG. 2.

For purposes of the below descriptions, the data to be re-encrypted can be part of an initial encryption region, nominated "encryption region A" in the below descriptions and diagrams. As indicated previously, an encryption region can be associated with a single cryptographic key such that data that is part of the encryption region is protected by being stored in an encrypted form, the encrypted form being generated with reference to the cryptographic key that is associated with that cryptographic region. Thus, the data to be re-encrypted, as part of the encryption region A, can, initially, be stored in encrypted form, the encrypted form being generated with reference to the cryptographic key that is associated with the encryption region A. To re-encrypt the data, such that it is no longer stored in an encrypted form generated with reference to the cryptographic key that is associated with encryption region A, and is, instead, stored in encrypted form generated with reference to a different cryptographic key, the data can be moved to a different, subsequent, encryption region, nominated "encryption region B" in the below descriptions and diagrams. As will be understood by those skilled in the art, because the encryption region B is different from the encryption region A, a cryptographic key utilized to encrypt the data stored in the encryption region B differs from that utilized to encrypt the data stored in encryption region A. As such, moving the data from encryption region A to encryption region B affects a re-encryption of the data, as it is no longer encrypted by the cryptographic key associated with the encryption region A, and is, instead, encrypted with the cryptographic key associated with the encryption region B. In such a manner, the actual re-encryption of the data is performed by the independent cryptographic agents traditionally charged with encrypting data written to the storage device, and decrypting data read from the storage device.

As shown in the system 200 of FIG. 2, a chunk 251 of data from the encryption region A 261 that is to be re-encrypted, such as by moving it to the encryption region B 241, can be copied from the encryption region A 261 to, for example, short-term memory 230 of a computing device, as the copy of the chunk 253. The short-term memory 230 can be any of the computer readable storage media referenced above in connection with the computing device 100 of FIG. 1, but is most likely to be the RAM 132, as would be recognized by those skilled in the art.

Once the copy 291 of the chunk 251 to the short-term memory 230 of the computing device is completed, the encryption region A 261 can be contracted by an amount equal to the chunk 251 as shown by the action 270 in the system 200 of FIG. 2. Subsequently, and thus illustrated below in accordance with the time arrow indicator of FIG. 2, the encryption region B 241 can be expanded as shown by the action 280. Once the expansion 280 of the region B 241 is completed, the copy of the chunk 253 retained in short-term memory 230 can be copied, as shown by the copy action 292, to the newly-expanded encryption region B 242, where it will be stored as chunk 252. As will be recognized by those skilled in the art, the data of chunk 252 can, in the configuration 220, be stored in an encrypted form, where such data was encrypted with reference to the cryptographic key associated with the newly-expanded encryption region B 242, and can, thereby, be re-encrypted from its original state in the chunk 251, where it would have been stored in an encrypted form that was generated with reference to the cryptographic key associated with the encryption region A 261.

As shown by the same relative horizontal placement in the system 200 of FIG. 2, the chunk 252 can be stored in the same "location" on the storage device as the chunk 251. As utilized herein, the term "location" is meant to refer to the addressing, or other identification, by which data stored on the storage device is located. Because the chunk 252 can be stored in the same location as the chunk 251, at the end of the re-encryption that is exemplarily illustrated in FIG. 2, the structure identifying various encryption regions and the locations of data, need not be modified to account for the re-encryption.

The mechanisms illustrated in the system 200 of FIG. 2 with reference to the chunk 251 can be repeated, in an equivalent manner, for all of the remaining data of the encryption region A 262. Ultimately, as can be deduced by those skilled in the art, the encryption region B will be, chunk-by-chunk, expanded until the encryption region B encompasses all of the locations previously encompassed by encryption region A, and encryption region A will have been shrunk to a zero sized region. In one embodiment, an explicit directive can, at the end of such a re-encryption, be issued to explicitly remove the zero sized encryption region A from the structure identifying various encryption regions if zero sized encryption regions are not automatically deleted.

Figure 3:
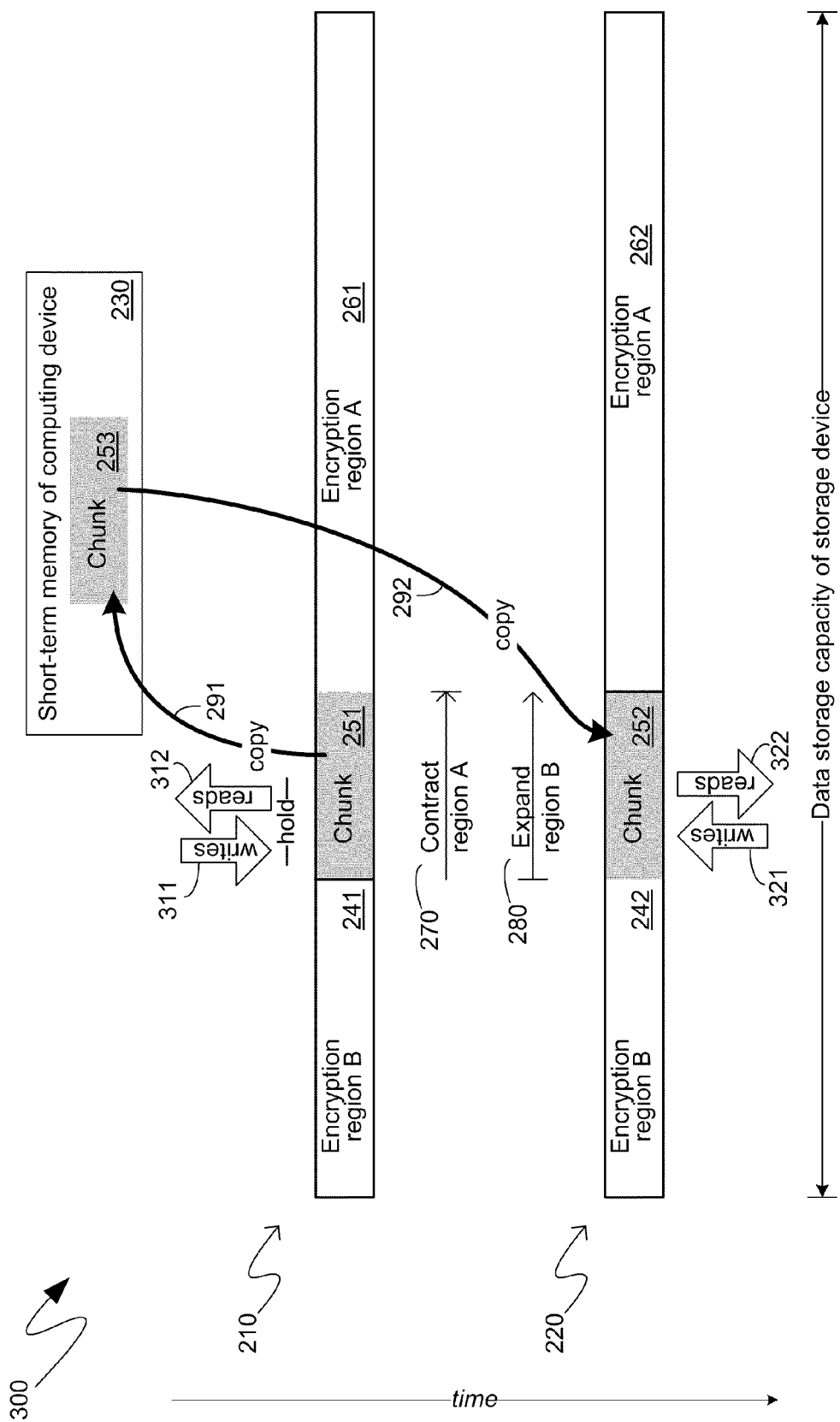
FIG. 3 is a block diagram of an exemplary online, in-place re-encryption of data.

Turning to FIG. 3, the system 300 shown therein comprises the same mechanisms as those described previously with reference to FIG. 2, with additional aspects that can enable the re-encryption of data to be performed while maintaining the accessibility of all but the data that is, at any given point in time, currently being re-encrypted. For purposes of clarity and consistency, those elements that are unchanged from prior figures retain their same reference numerals throughout subsequent figures. Thus, as shown in FIG. 3, again with reference to the time arrow indicator on the left side of the diagram, initially the writing 311 of data to the chunk 251 that is currently being re-encrypted, and the reading 312 of data from the chunk 251, can be held. Once the currently pending reads and writes have completed, and all remaining reads 312 and writes 311 are held, the chunk 251 can be copied by the action 291, in the same manner as described previously. Similarly, the contraction of region A and expansion of region B by the actions 270 and 280, respectively, in the copying back of the chunk 252 by the action 292 can, likewise, proceed in the same manner as described previously. Once the copy action 292 has completed, the reading 322 of data from the chunk 252, and the writing 321 of data to the chunk 252 can be allowed to proceed, and the previously implemented hold can be lifted.

As before, successive chunks, such as the chunk 251, of the remaining encryption region A 262 can be re-encrypted in a similar manner, with reads 312 and writes 311 directed to such successive chunks being held prior to the copy action 291 and the region adjusting actions 270 and 280, and then being released from being held once the copy action 292 has completed. In such a manner, the data on the storage device, other than the data of the specific chunk being re-encrypted, can remain accessible, such as to processes or other computer-executable instructions executing on one or more computing devices to which such a storage device is communicationally coupled.

In one embodiment, the reads 312, rather than being held, as shown in the system 300 FIG. 3, can, instead, be redirected to the chunk 253 residing in the short term memory 230 of the computing device. In such a manner, at least as far as the reading 312 of data is concerned, even the data of the chunk 251 being re-encrypted can remain accessible during re-encryption.

As may be recognized by those skilled in the art, the re-encryption mechanisms illustrated in FIGS. 2 and 3, and described in detail above, may not be able to recover from faults, such as a loss of power or other unexpected interruptions. More specifically, if the copy of the chunk 253 in the short term memory 230 is lost after encryption region A has been contracted by action 270, but before the copy of the chunk 253 has been stored on the storage device as chunk 252, the data of the chunk can be irretrievably lost.

Figure 4:
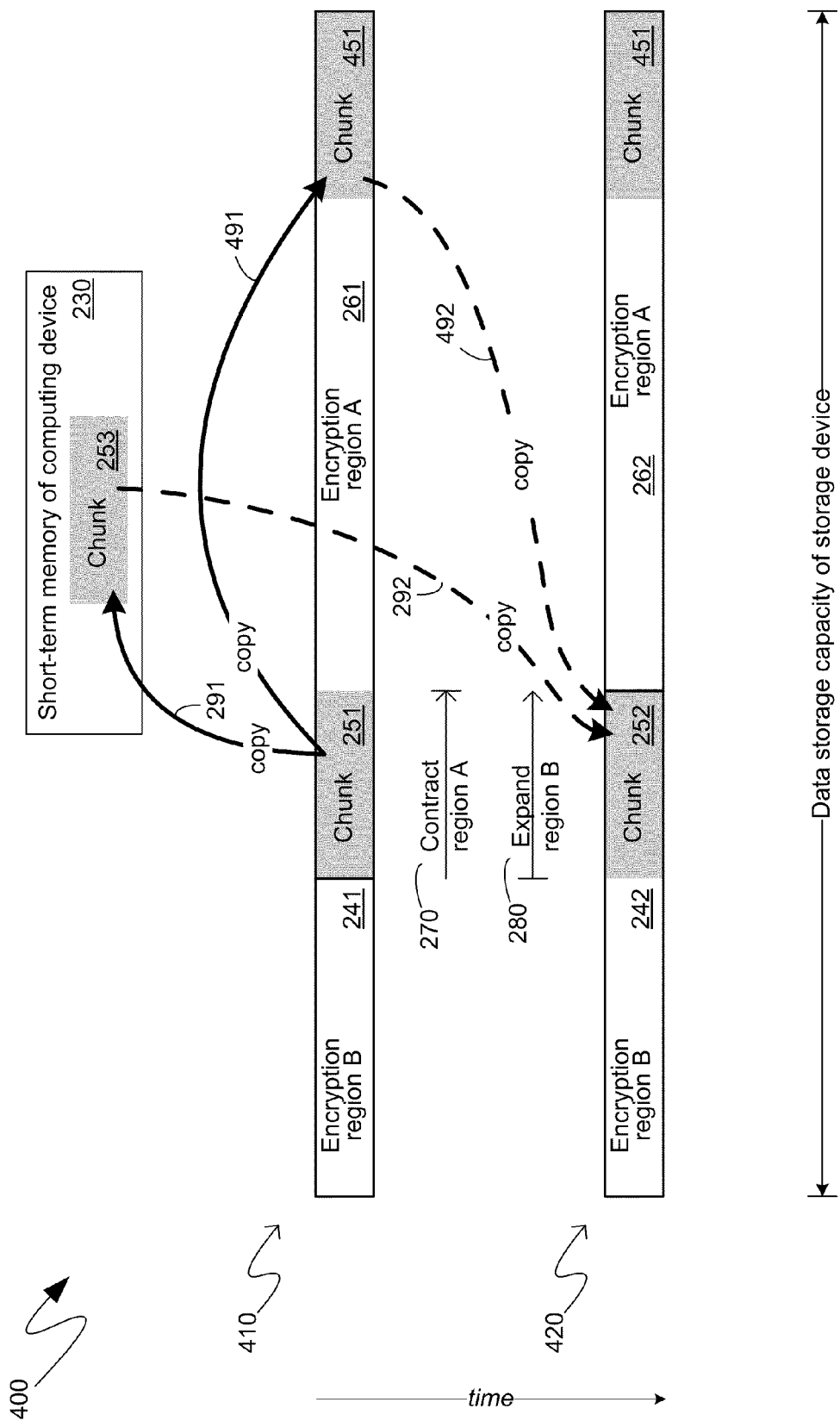
FIG. 4 is a block diagram of an exemplary fault-tolerant, offline, in-place re-encryption of data.

Turning to FIG. 4, the system 400 shown therein illustrates an exemplary mechanism that can provide fault tolerance to prevent the loss of data in situations such as that just described. More specifically, as shown in the system 400 of FIG. 4, the copy action 291 described previously can be augmented with a copy action 491 that copies the chunk 251 to another portion of the encryption region A 261 as the chunk 451. Although not specifically nominated as such in the Figures, for ease of reference herein, such a location will be referred to as a "logging location". The configuration 410, differs from the configuration 210, described previously, by virtue of this logging location which, in the configuration 410, comprises the copy of the chunk 451. In one embodiment, in addition to the data of the chunk 251, the chunk 451 can further comprise a header describing the location of chunk 251. As will be described in detail below, such header-based location information can be utilized to recover in the case of a fault and, thereby, aid in providing fault tolerance.

The contraction of the region A and expansion of the region B by the actions 270 and 280, respectively, can then proceed as described in detail above. Should a fault, such as a loss of power, occur and cause the chunk 253, retained in the short term memory 230 of the computing device, to be lost, the copy action 292 can, instead, be replaced by the copy action 492 that copies the chunk 451 from the logging location to the encryption region B 242 as the previously described, re-encrypted chunk 252. Of course, if no such fault occurs, the copy action 292 can proceed as described in detail above. The copy actions 292 and 492, therefore, are shown in FIG. 4 with dashed lines to represent that they are alternatives of one another.

In one embodiment, the copy action 491 can utilize known, existing mechanisms to ensure that the chunk 451 is stored in non-volatile manner, such as being stored directly on a non-volatile computer-readable storage medium, instead of in a cache, such as typically is maintained on volatile computer-readable media. As one example, the copy action 491 can utilize write-through or flush cache semantics to ensure that the chunk 451 is stored directly on the non-volatile computer readable storage media of the storage device. Optionally, before proceeding to perform the actions 270 and 280, a double-check of the data stored as chunk 451 is to be performed, such as by validating the copy of the chunk 451, comparing a hash value of the chunk 451 to the chunk 251, or other similar double-check.

Should a fault occur while the re-encryption mechanisms illustrated by the system 400 of FIG. 4 are being executed, the chunk 451 can be utilized to recover and not lose any of the data of the chunk 251 that was being re-encrypted at the time of the fault. More specifically, when initially executed, the cryptographic management 161, shown in FIG. 1, can first check for the presence of data in the logging location, such as the chunk 451, since the mere existence of such data in the logging location can indicate that the re-encryption process was terminated, possibly due to a fault, prior to completion.

Once a determination is made that the re-encryption process was terminated prior to completion, a further determination can be made as to when, within the sequence of steps described in detail above, such a termination occurred. Such a further determination can examine the relative locations of the encryption region A and encryption region B. For example, if there exists a gap between encryption regions A and B, it is likely that the re-encryption process was terminated after the contraction of region A was performed by action 270, but prior to the expansion of region B that would have been performed by action 280. In such a case, the cryptographic management 161, shown in FIG. 1, can proceed to expand the region B, as shown by the action 280 in FIG. 4, and can then copy the contents of chunk 451 to the newly expanded region B 242 as the chunk 252, as shown by the action 492. Alternatively, if no gap is found between the encryption regions A and B, then a determination can be made as to whether actions 270 and 280 have already been performed in connection with the re-encryption of the current chunk 251, or whether actions 270 and 280 have yet to be performed in connection with the re-encryption of the current chunk 251.

Such a determination can be made with reference to the chunk 451. More specifically, in one embodiment if the location field in the header of chunk 451 identifies the encryption region A 261, and the chunk 451 matches chunk 251 in the encryption region A 261, then it can be determined that the actions 270 and 280 have yet to be performed since the chunk 451 in the logging location matches the chunk 251 that is still in the "existing" encryption region A 261. Consequently, the actions 270 and 280 can be performed, followed by the copy action 492, as described previously. Alternatively, if the location field in the header of chunk 451 identifies the encryption region A 261, but the chunk 451 does not match the chunk 251 in the encryption region A 261, it can be determined that the failure occurred during copy action 491 and processing can proceed with the initial copy actions 291 and 491, and then subsequently perform the actions 270 and 280 and the copy 292, all as described in detail above. In another embodiment, if the location field in the header of chunk 451 identifies the encryption region B 242 and the chunk 451 matches chunk 252 in the encryption region B 242, then it can be determined that the actions 270 and 280, and indeed the copy action 292, had performed prior to the termination of the re-encryption process. Consequently, the re-encryption process can resume with the selection of a subsequent chunk, and proceed accordingly. In yet another embodiment, if the location field in the header of chunk 451 identifies the encryption region B 242 but the chunk 451 does not match the chunk 252 in the encryption region B, it can be determined that actions 270 and 280 had already been performed, since, as will be recognized by those skilled in the art, the expansion of the encryption region B 242, by the action 280, over the location of the chunk 251 essentially renders such data meaningless, since the key with which such data was encrypted, namely the key associated with the encryption region A, is no longer associated with the encryption region to which such a location now belongs. Consequently, it can be determined that actions 270 and 280 had already been performed, but that the copy 292 had, at least, not completed properly prior to the termination of the re-encryption. Thus, in such a case, the re-encryption process can resume with the copying of the chunk 451 to the chunk 252, as shown by the copy action 492.

In one embodiment, prior to utilizing the chunk 451 retained in the logging location to recover from a fault, such as in the manner described in detail above, the chunk 451 can be verified, such as with reference to a checksum, or other such algorithmic verification. If the chunk 451 fails such a verification, processing can proceed with the initial copy actions 291 and 491, and then subsequently perform the actions 270 and 280 and the copy 292, all as described in detail above.

Figure 5:
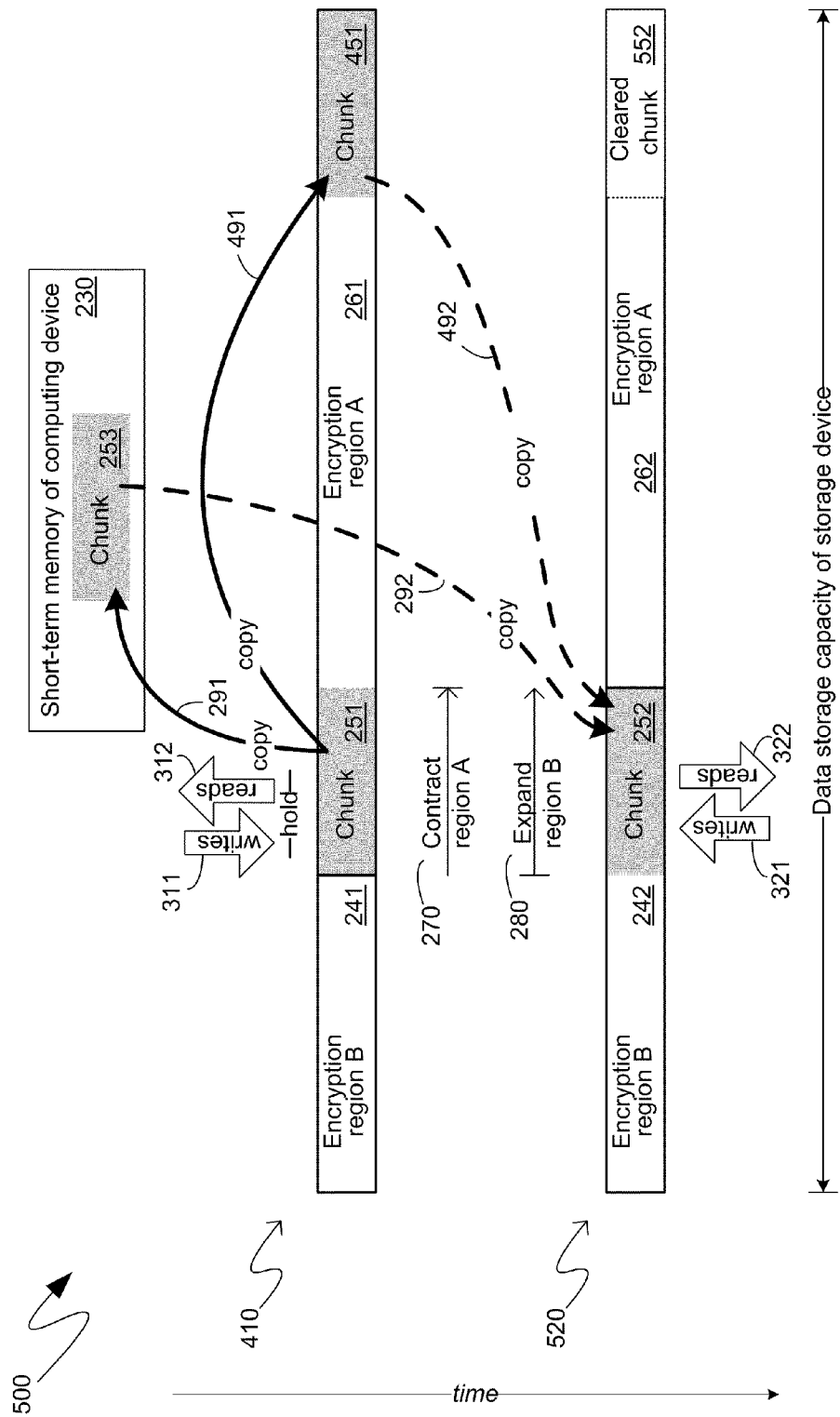
FIG. 5 is a block diagram of an exemplary fault-tolerant, online, in-place re-encryption of data.

Turning to FIG. 5, the system 500 shown therein illustrates the fault tolerant mechanisms described in detail above with reference to the system 400 of FIG. 4, except that such mechanisms are now being performed while the storage device remains accessible to the computer-executable instructions executing on one or more computing devices communicationally coupled to such a storage device. Thus, as explained previously in reference to system 300 of FIG. 3, the reads 312 and writes 311 directed to the chunk 251 currently being re-encrypted can be held pending its re-encryption. In one alternative embodiment, described in detail above, the reads 312, rather than being held, can, instead, be redirected to the chunk 253 residing in the short term memory 230 of the computing device. In another alternative embodiment, since a copy of the chunk 251 resides not only in the short-term memory 230, as the chunk 253, but also in the logging location, as the chunk 451, the reads 312, rather than being held, or being redirected to the chunk 253, can, instead, be redirected to the chunk 451 in the logging location. As in the case of the redirection of such reads 312 to the chunk 253, described in detail above, the redirection of the reads 312 to the chunk 451 can, likewise, serve to keep all of the data, including the data of the chunk 251 currently being re-encrypted, online and accessible, at least as far as the reading 312 of data is concerned.

The mechanisms of the system 500 can then proceed in the same manner as described previously with reference to system 400 of FIG. 4, except that, as shown in the system 500 of FIG. 5, the configuration 520 can differ from the configuration 420 shown in FIG. 4, in that the chunk of 451 stored in the logging location can be explicitly cleared, as indicated by the cleared chunk 552, after the completion of the copy 492. Again, as before, mechanisms, such as write-through or flush cache semantics can be utilized to ensure that the cleared chunk 552 is stored on a non-volatile computer readable storage medium.

When the reads 322 and, more particularly, the writes 321 are re-enabled for the chunk 252, as explained in detail previously, the contents of the chunk 252 can change. Should the re-encryption process be terminated at such a time, such as due to a fault, the above-described mechanisms for recovering from such a fault by utilizing the chunk 451 may not operate properly as the location field in the header of chunk 451 may point to the encryption region B 242, but the chunk 451 may not match the chunk 252, due to the writes 321 that were allowed to modify the contents of the chunk 252. Thus, the above described mechanisms for recovering from terminations of the re-encryption process prior to its completion can be modified such that, if the logging location points to the encryption region B 242 but does not match the contents of the chunk 252, then rather than performing the copy action 492 again, in the manner described above, which would result in the overwriting of the writes 321 that were allowed to occur, and thereby cause the loss of such data, reference can, instead, be made to the cleared chunk 552. If the contents of the logging location have been cleared, such as indicated by the cleared chunk 552, then the determination can be made that, even though the contents of the chunk 451 do not match those of the chunk 252, the copy action 492 had completed successfully and that the contents of the chunk 252 reflect further modifications, such as caused by the writes 321, after the completion of such copy action 492. Thus, in such a case, re-encryption can resume with the selection of a subsequent chunk in the encryption region A for re-encryption.

Figure 6:
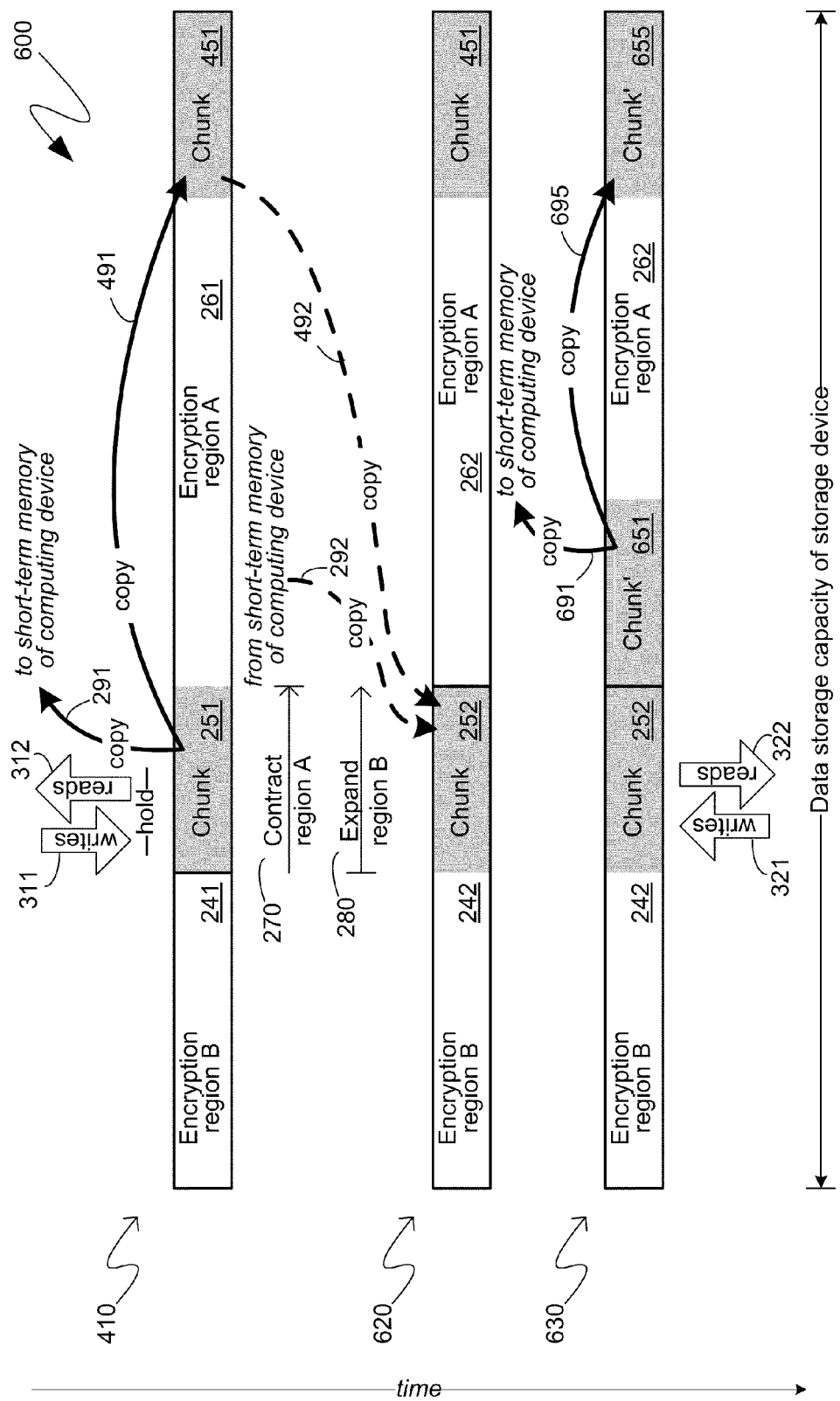
FIG. 6 is a block diagram of another exemplary fault-tolerant, online, in-place re-encryption of data.

Turning to FIG. 6, the system 600 shown therein illustrates an optimization, in accordance with one embodiment, to the system 500 of FIG. 5 that was just described in detail. More specifically, the explicit action of clearing the logging location to generate the cleared chunk 552 shown in FIG. 5, can be skipped and the overall re-encryption process can, thereby, be optimized if the reads 322 and, more importantly, the writes 321 are held for one more cycle. Thus, as shown in the system 600 FIG. 6, again following the temporal flow illustrated by the time arrow shown on the left hand side of the figure, the reads 311 and writes 312 directed from and to the chunk 251 can be held, the chunk 251 can be copied to the short-term memory of the computing device and to the logging location, as indicated by the copy actions 291 and 491, and the encryption region A 261 can be contracted and the encryption region B 241 can be expanded, as illustrated by the actions 270 and 280, all of which was described in detail above. Subsequently, the contents of the chunk 251 can be written back into the newly expanded encryption region B 242, as the chunk 252, as illustrated by the alternative copy actions 292 and 492, again all described in detail above.

However, in the system 600 shown in FIG. 6, the configuration 620 can differ from the configuration 520, described previously, in that the chunk 451 can remain in the logging location. The re-encryption of the chunk 251, as the chunk 252 in the newly expanded encryption region B 242, can be complete except that the writes 321 and reads 322 to and from the chunk 252 can continue to be held while re-encryption is commenced on a subsequent chunk, nominated "chunk prime" 651 in FIG. 6. Thus, as shown in the system 600 of FIG. 6, re-encryption of the subsequent chunk 651 can commence with copy actions 691 and 695 that can copy the contents of the subsequent chunk 651 to the short-term memory of the computing device and to the logging location, as chunk 655, in the same manner as the copy actions 291 and 491, described above. Once the copy actions 691 and 695 are completed, and any optional verifications thereof are completed, then the writes 321 and the reads 322 to and from the chunk 252, whose re-encryption had already been completed, can be enabled and no longer held.

In such a manner, the explicit clearing of the contents of the chunk 451 from the logging location can be skipped, since, in the case of a fault, because the writes 321 had not yet been enabled, the chunk 451 will continue to match the chunk 252 until the re-encryption of the subsequent chunk 651 had commenced. In recovering from such a fault, the contents of the logging location, namely the chunk 451, can be copied to the chunk 252 without the previously described concern of overwriting changes to the chunk 252, caused by the writes 321, since such writes 321 would not be enabled until a time, represented by the configuration 630, at which point the location field within the logging location, namely the header associated with the subsequent chunk 655, would no longer point to the chunk 252, and would, instead, point to the subsequent chunk 651. Thus, there is no reason to explicitly clear the contents of the logging location to serve as a fault recovery guide and, consequently, such a step can be omitted, resulting in greater efficiencies.

Figure 7:
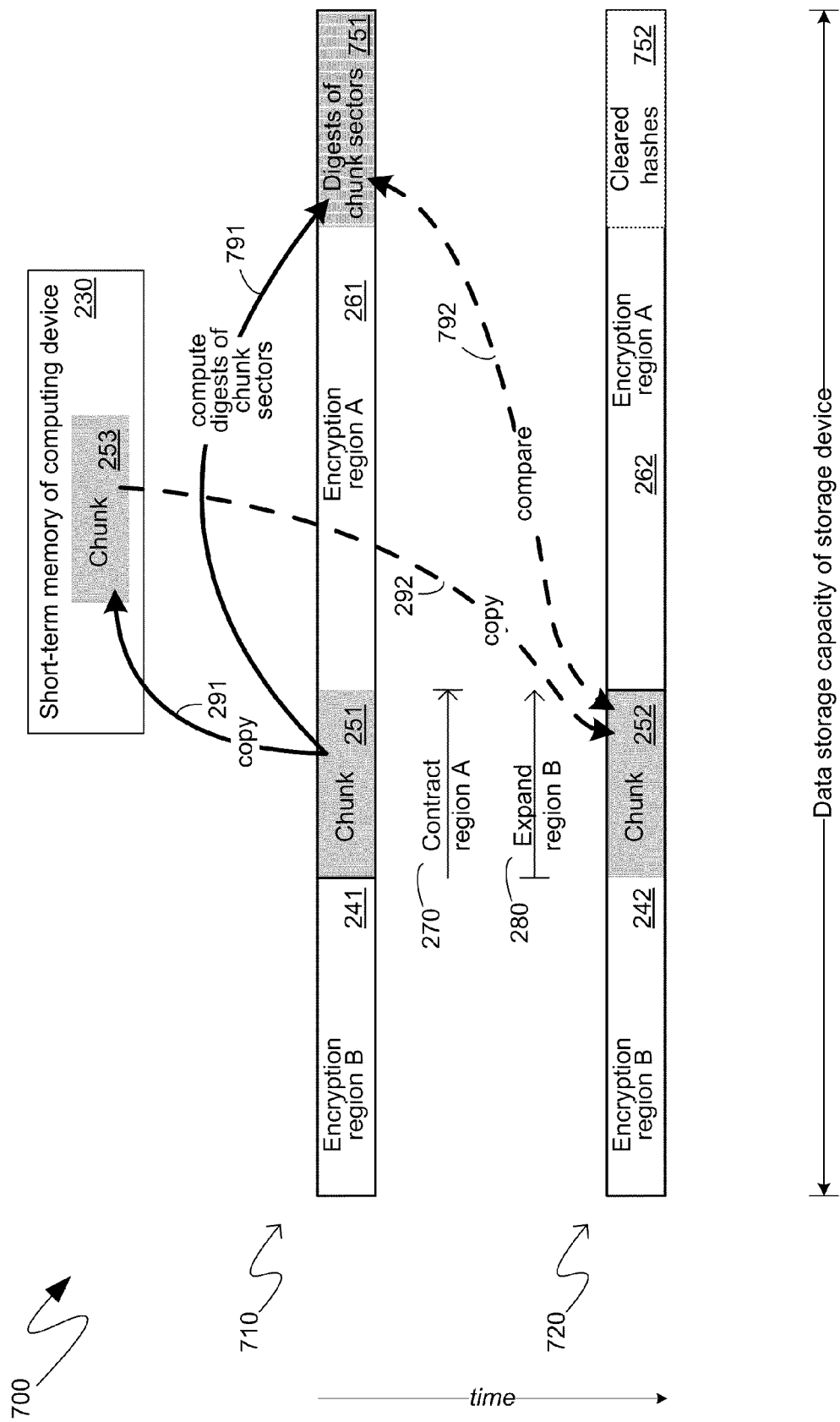
FIG. 7 is a block diagram of yet another exemplary fault-tolerant, online, in-place re-encryption of data.

In another embodiment, illustrated by the system 700 of FIG. 7, efficiencies can be realized by avoiding the copy 491 of all of the data of the chunk 251 to the logging location as the chunk 451. Instead, as shown by the system 700 of FIG. 7, components of the chunk 251, such as individual sectors, blocks, or other like quantization of the chunk 251, can have digest values computed for each of them and only those digest values can be stored in the logging location as the digests of chunk sectors 751, as illustrated by the action 791 shown in FIG. 7. Thus, the configuration 710 differs from the configuration 410 described and illustrated previously, in that the logging location does not comprise a copy of the chunk 251, but rather, instead, comprises only digests of chunk sectors 751. Of course, were such an embodiment to be utilized while maintaining the accessibility of the data, the reads 312 could not be redirected to the logging location, in the manner described previously, since the logging location would not contain an identical copy of the chunk 251, but rather would contain the digests of chunk sectors 751. As will be recognized by those skilled in the art, digests of individual chunk sectors can be more efficiently copied to the logging location, as the digests of chunk sectors 751, than could all of the data of the chunk 251.

Processing can then proceed as described previously, except that, in the case of a fault, that can result in the loss of the chunk 253 from the short-term memory 230 of the computing device, rather than copying the chunk 451 from the logging location to the chunk 252 in the newly expanded encryption region B 242, a comparison action 792 can, instead, be undertaken, whereby digests of individual sectors, or other components, of the chunk 252 are compared against digests of those same sectors, or other components, as stored in the logging location as the digests of chunk sectors 751. More specifically, if the location field in the logging location identifies the encryption region A 261, then recovery can proceed from the initial copy action 291. However, if the location field identifies the encryption region B 242, the comparison action 792 can be performed. While the comparison action 792 is shown as occurring directly between the digests 751 and the chunk 252, realistically such a comparison action would likely be more efficient, and would, therefore, likely be performed within the short-term memory 230, such as by first copying the chunk 252 to the short-term memory 230 and calculating the relevant digests there. As indicated, the digest comparison 792 can be on a sector-by-sector basis such that, if the digests of one sector match, then the comparison can proceed to the next sector. Ultimately, a determination can be made regarding whether the digests of the chunk sectors 751 match the data of the chunk 252, as part of the newly expanded encryption region B 242. Such a comparison can identify when, during the reencryption process, the failure occurred. More specifically, if the digests match, then processing can proceed with the next chunk. If the digests do not match, the actions 270 and 280 can be undone and a comparison action analogous to the comparison action 792, just described, can be undertaken between the chunk 251, now back as part of the encryption region A 261, and the digests 751. If, initially, some of the digests match, then the comparison can proceed until the digests no longer match, at which point the data in the chunk 251 can be reconstructed with the digest information of the digests of chunk sectors 751. After the data of the chunk 251 is reconstructed, processing can then proceed again with the reencryption of the chunk 251. To fully recover, however, a storage device can be utilized that can guarantee that a sector is either written or not. If it is not written, the original data remains, and if it is written, the new data is written and in both cases such actions can be atomic. If a storage device is utilized that simple "tears" on a failure, such as a power failure, and does not complete the sector write, a damaged or bad block can remain and fault tolerance may not be achieved. Additionally, as indicated, in one embodiment, the actions 270 and 280, in changing the size of the encryption regions A and B, may need to be undone and, in such an embodiment, encryption mechanisms can be utilized that can provide for such an undoing.

While the above descriptions have been directed to re-encryption methodologies wherein the re-encrypted data is stored in the same location, in other embodiments, the re-encrypted data can be stored in a location offset from its original location. Such "out-of-place" re-encryption can be performed more efficiently, as will be shown, but can require that partition tables, or other like addressing information, or other such databases, can be adjusted to account for the "shift" in the location of data. Additionally, for such "out-of-place" re-encryption to be performed, a gap can be established between encryption regions such that either the first, or the last, chunk to be re-encrypted has someplace to be stored without requiring reformatting of the storage device, or, at least, a readjustment of the encryption regions. As will be recognized by those skilled in the art, the referenced "shift" can be a logical shift, since the actual physical locations in which such information is stored can vary greatly depending on the storage mechanism and storage media being utilized by the storage device.

Figure 8:
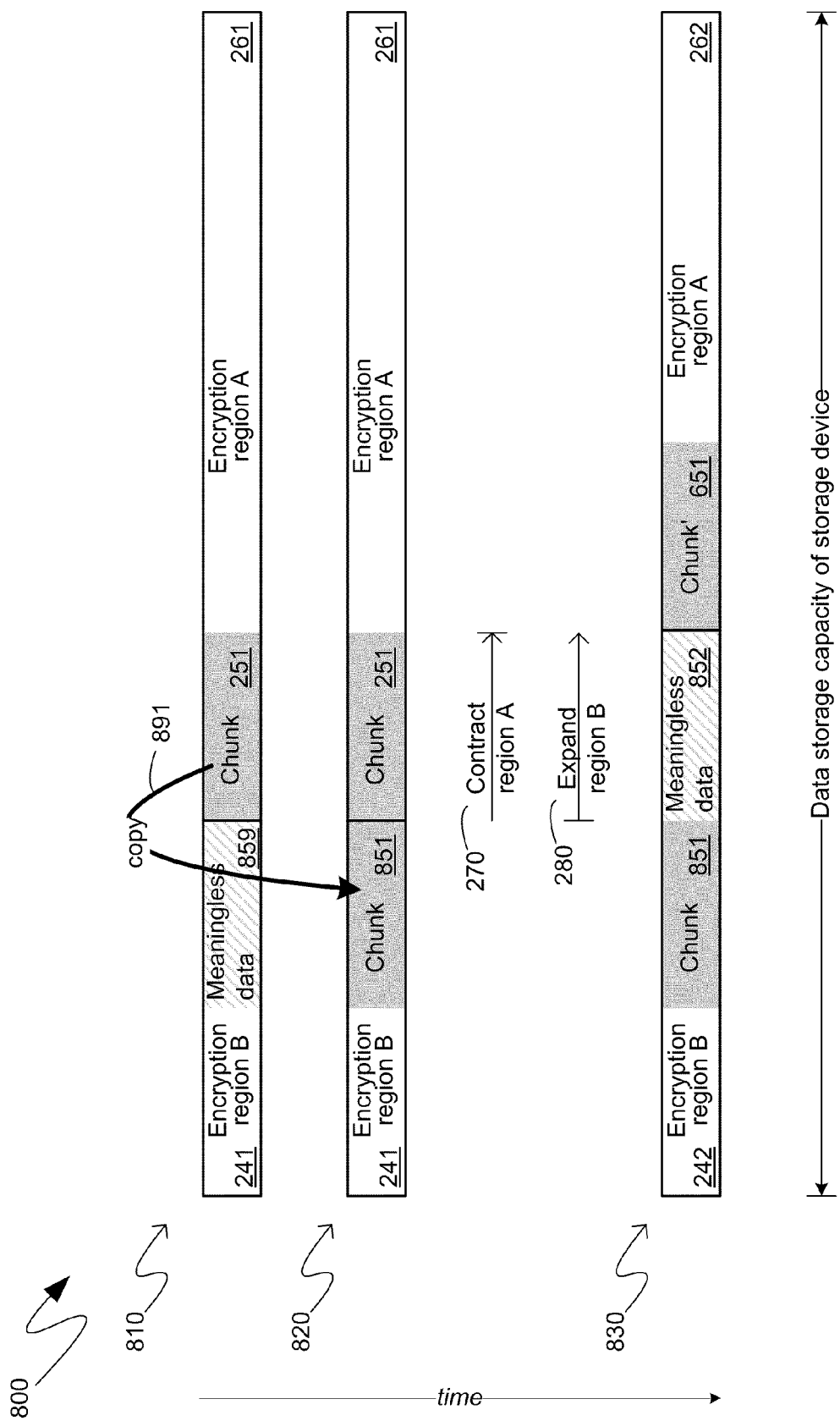
FIG. 8 is a block diagram of an exemplary offline, out-of-place re-encryption of data.

Turning to FIG. 8, system 800 shown therein illustrates one exemplary mechanism for performing such an "out-of-place" re-encryption. Initially, a configuration 810 can exist that is similar to that described in detail above, with the exception that the encryption region B 241 can comprise a section of meaningless data 859 that can be analogous to the meaningless data 852, whose creation and presence is described in greater detail below. Subsequently, the contents of the chunk 251 can be copied to a chunk 851 that is part of the encryption region B 241. In one embodiment, the chunk 851 can be at the boundary between the encryption region B 241 and the encryption region A 261, such that the chunk 851, while part of the encryption region B 241, is adjacent to the chunk 251 that is at the edge of the encryption region A 261. In other embodiments, however, the size of the meaningless data 859 can be greater than that of the chunk 851, such that the chunk 851 is not immediately adjacent to the encryption region A 261. The configuration 820, subsequent to the configuration 210, can, thereby, comprise the encryption that region B 241, with the re-encrypted chunk 851, together with the encryption region A 261, comprising the original, non-re-encrypted chunk 251, where neither the encryption region B 241 nor the encryption region A 261 have yet to be adjusted to account for the re-encryption of the chunk 251, as the re-encrypted chunk 851. Instead, only after the configuration 820 has been established can the contraction of the encryption region A 261, as illustrated by the action 270, and the expansion of the encryption region B 241, as illustrated by the action 280, all described in detail above, be performed.

The result of the encryption region adjustment actions 270 and 280 can be the configuration 830 shown in FIG. 8, where the newly expanded encryption region B 242 comprises both the re-encrypted chunk 851 and, adjacent to it, at the new boundary between the newly expanded encryption region B 242 and the newly contracted encryption region A 262, a chunk of meaningless data 852 that was previously the chunk 251 when it was associated with the cryptographic key associated with the encryption region A 261. The subsequent chunk 651 can then be copied into the newly expanded encryption region B 242 and only overwrite the meaningless data 852. In such a manner, re-encryption of all of the data previously associated with the encryption region A can be accomplished, except that, as will be recognized by those skilled in the art, the location of the re-encrypted data will be offset from the location of the originally encrypted data, typically by an amount at least as large as one chunk. Consequently, partition tables, addressing databases, or other such addressing and locating information may need to be adjusted to account for such a "shift" in the location of the data.

Should a failure occur during the processes illustrated by FIG. 8, the reencryption process could resume based on the existence, if any, of a gap between the encryption regions A and B. More specifically, if the failure occurred after the performance of the action 270 had completed, but before the performance of the action 280 had completed, there can be a gap between the encryption region A 262 and the encryption region B 241. In such a case, reencryption can resume with the performance of the action 280. If no such gap exists, a reencryption resuming from a failure can proceed with the copy action 891.

Figure 9:
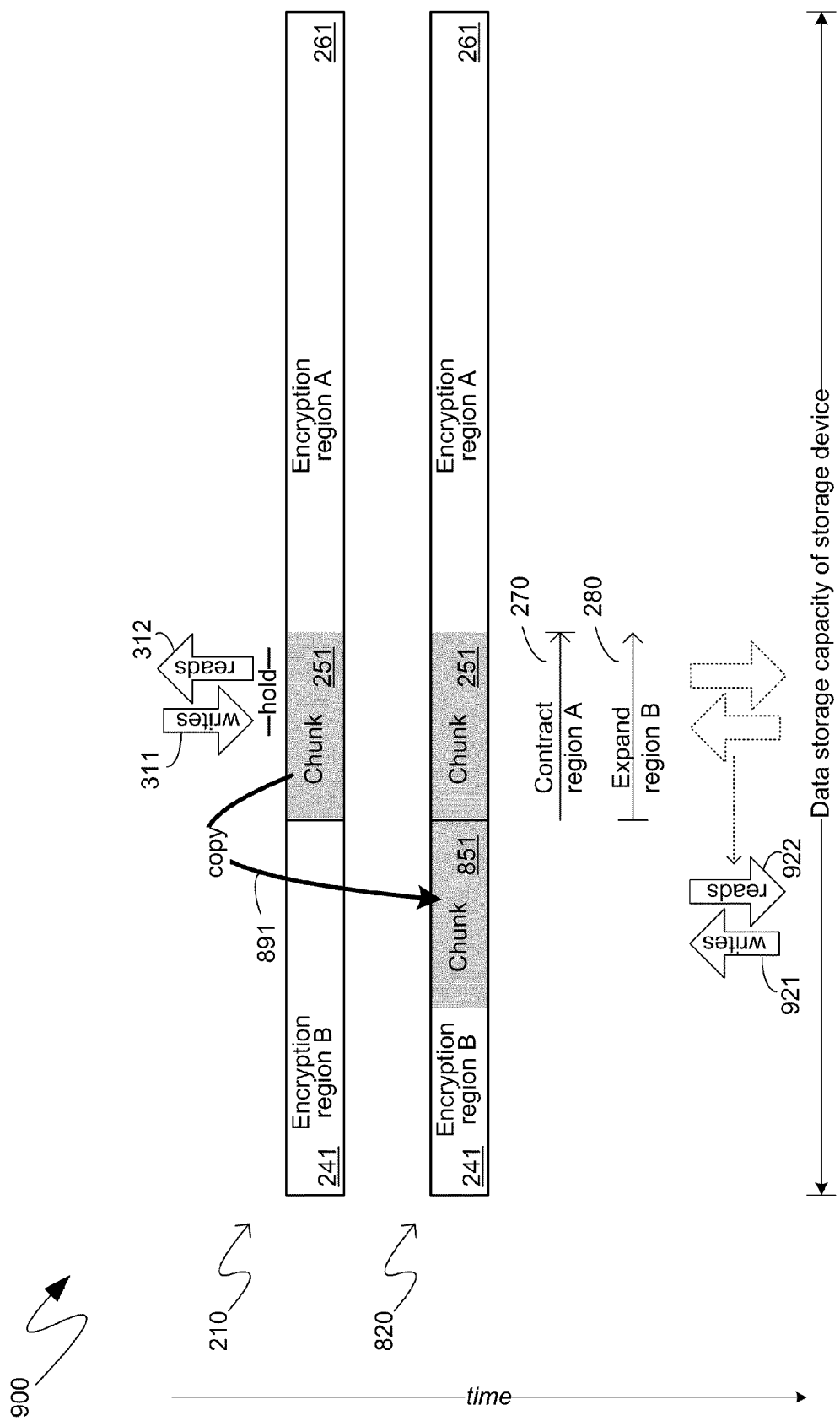
FIG. 9 is a block diagram of an exemplary online, out-of-place re-encryption of data.

As described previously, the re-encryption mechanisms can be performed while the data remains accessible to computer-executable instructions executing on one or more computing devices communicationally coupled to the storage device whose data is being re-encrypted. Turning to FIG. 9, the system 900 shown therein illustrates the re-encryption mechanisms described with reference to FIG. 8 except that the storage device whose data is being re-encrypted remains accessible. Thus, as described above, the writes 311 and reads 312 to and from the chunk 251 being re-encrypted can be held pending its re-encryption. Once such a re-encryption has been completed, as the chunk 851, the writes 921 and the reads 922 can be allowed to proceed, except that, as shown in the system 900 of FIG. 9, the addressing, or other location identification information, of the writes 921 and reads 922 can be adjusted to account for the shift in the location of the re-encrypted chunk 851 relative to the prior, originally encrypted chunk 251. More specifically, while a gap can be established between encryption regions, as indicated previously, in one embodiment this gap can be made to be invisible to the operating system 134 and other program modules 135, such as shown in FIG. 1. Thus, while the size of the encryption region that has already been re-encrypted, such as the encryption region B 241 in the system 900 of FIG. 9, can have been increased, the size of the encryption region that has yet to be re-encrypted, such as the encryption region A 261, can remain the same. Consequently, while reads and writes to locations within encryption region A 261 can, therefore, be passed through, reads and writes to locations within encryption region B 241 can be shifted by the size of the gap. Reads and writes to the chunk being re-encrypted, such as the chunk 251 of the system 900 shown in FIG. 9, can be held and, on completion of that chunk, can be adjusted to account for the shift. In an alternative embodiment, the reads and writes of the encryption region B 241 can be passed through while those directed to the encryption region A 261 can be shifted by the size of the gap. In such an embodiment, reads and writes to the chunk being re-encrypted, such as the chunk 251, can be held and, on completion of that chunk, can be changed to no longer account for the shift and instead be passed through without adjustment.

While the descriptions above have made reference to chunks of data, such as the chunk 251, the size of such a chunk has not been explicitly defined. In one embodiment, the size of the chunk can remain static throughout the re-encryption process. In an alternative embodiment, however, the size of the chunk can be dynamically adjusted and optimized given any applicable constraints on computing resources then existing. More specifically, a smaller chunk size can decrease the immediate impact of any re-encryption if, for example, the storage device on which such a re-encryption is being performed remains accessible while the re-encryption is being performed, since such a smaller chunk size can result in fewer reads and writes being held, and otherwise delayed. However, a smaller chunk size can increase the duration of the re-encryption, since a greater number of chunks will need to be processed, such as by the above described mechanisms, for any given amount of data to be re-encrypted. Conversely, a larger chunk size can decrease the duration of the re-encryption, since a smaller number of chunks will need to be processed for any given amount of data to be re-encrypted. But such a larger chunk size can increase the immediate impact of the re-encryption, if the storage device in which the re-encryption is being performed remains accessible, since a larger chunk size can result in a greater number of reads and writes being held, and otherwise delayed. The alternative embodiment, therefore, contemplates dynamic adjustment of the chunk size such that smaller chunk sizes are utilized when increased input/output throughput is desired, and larger chunk sizes are utilized when increased re-encryption speed is desired.

Figure 10:
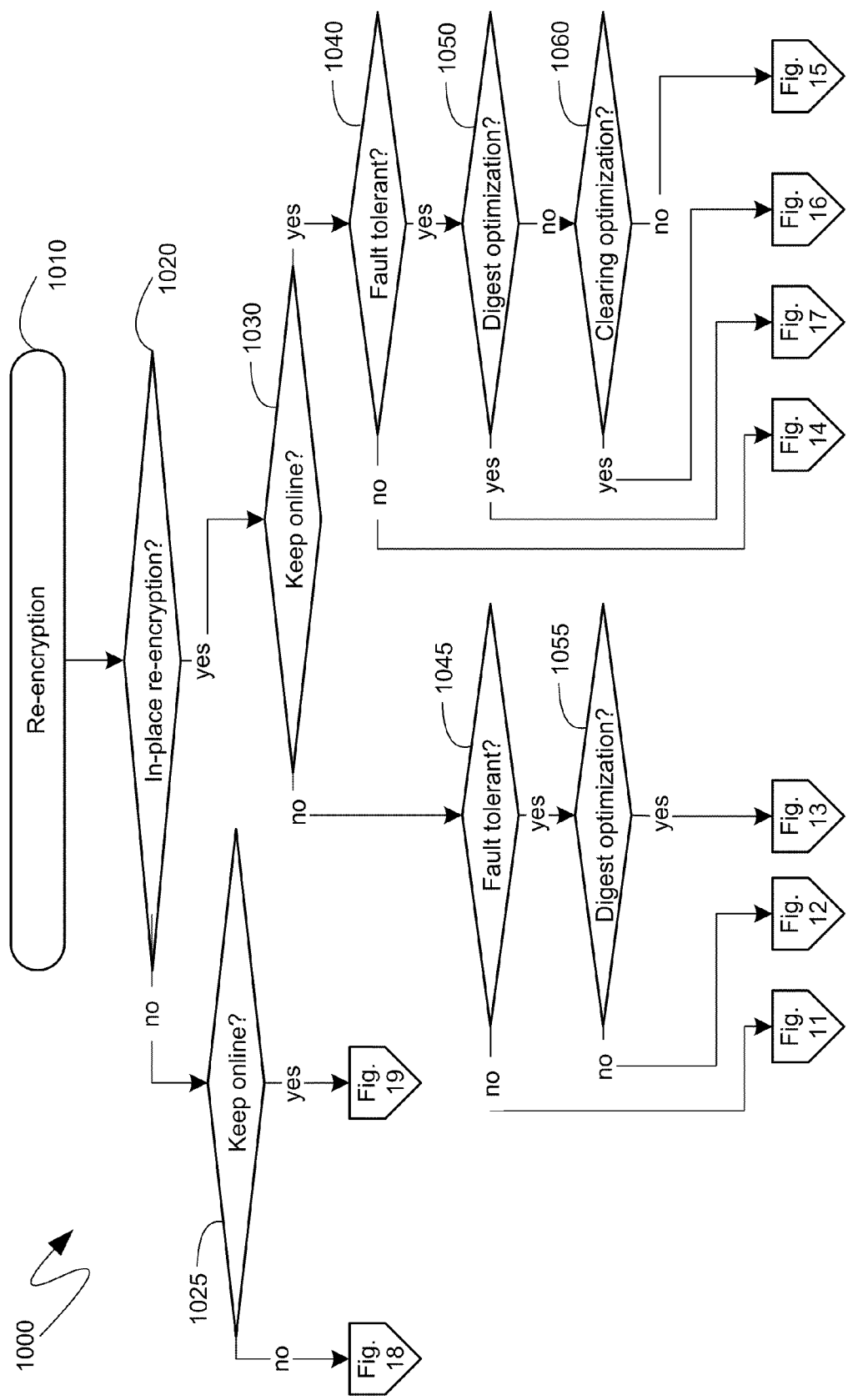
FIG. 10 is a flow diagram of an exemplary re-encryption of data.

Turning to FIG. 10, the flow diagram 1000 shown therein illustrates an exemplary series of preliminary steps that can be performed as part of the re-encryption mechanisms described in detail above. Specifically, as shown, re-encryption can be initiated at step 1010. Subsequently, at step 1020, a determination can be made as to whether an "in-place" or "out-of-place" re-encryption is to be performed. If, at step 1020, it is determined that an "out-of-place" re-encryption is being performed, a subsequent decision, at step 1025, can be made as to whether the volume, or other storage element or division, being re-encrypted is to be kept online during the re-encryption process. If, at step 1025, it is determined that the re-encryption is to be performed while the volume remains online, processing can proceed in accordance with the steps illustrated in FIG. 19. Alternatively, if, at step 1025, is determined that the re-encryption can be performed off-line, processing can proceed in accordance with the steps illustrated in FIG. 18.

A similar decision, at step 1030, can be made if the determination at step 1020 was that an "in-place" re-encryption was to be performed. If, at step 1030, it is determined that the re-encryption is to be performed while the volume remains online, a subsequent determination, at step 1040, can be made to determine whether or not the re-encryption is to be performed in a fault tolerant manner. If, at step 1040, it is determined that fault tolerance is not required, then processing can proceed in accordance with the steps illustrated in FIG. 14. Conversely, if, at step 1040, is determined that the "in-place" re-encryption is to be performed in a fault tolerant manner, further determinations, at steps 1050 and 1060 can determine whether optimizations to the fault tolerant mechanisms, such as the utilization of digests, or the avoidance of an explicit clearing step, respectively, are to be employed. If, at steps 1050 and 1060, it is determined that neither of such optimizations are to be employed, then processing can proceed in accordance with the steps illustrated in FIG. 15. If, however, the optimization directed to the utilization of digests is to be employed, as determined by step 1050, processing can proceed in accordance with the steps illustrated in FIG. 17, while if the optimization directed to the skipping of the explicit clearing step is to be employed, as determined by step 1060, processing can proceed in accordance with the steps illustrated in FIG. 16. In another embodiment, not specifically illustrated by the flow diagram 1000 of FIG. 10, both optimizations to the fault tolerant mechanisms can be simultaneously, as opposed to exclusively, utilized. The utilization of both optimizations together is merely the trivial combination of the mechanisms as described separately and, as such, is not further described or illustrated in the Figures.

Returning back to the decision at step 1030, if it is determined that the "in-place" re-encryption does not need to be performed while the volume remains online, then, processing can proceed to step 1045, at which point a decision can be made as to whether the re-encryption is to be performed in a fault tolerant manner. If, at step 1045, it is determined that the re-encryption need not be performed in a fault tolerant manner, processing can proceed in accordance with the steps illustrated in FIG. 11. If, however, at step 1045, it is determined that the re-encryption does need to be performed in a fault tolerant manner, a further decision, at step 1055, can be made regarding whether the optimization directed to the utilization of digests is to be employed. If, at step 1055, it is determined that such an optimization need not be employed, then processing can proceed in accordance with the steps illustrated in FIG. 12, while, if, at step 1055, it is determined that such an organization should be employed, then processing can proceed in accordance with the steps illustrated in FIG. 13.

As will be recognized by those skilled in the art, the decisions described above with reference to the flow diagram 1000 of FIG. 10 can be decisions that can be made by a human user, such as through a user interface that can be presented by, for example, the cryptographic management 161 shown in FIG. 1. Alternatively, the decisions of the flow diagram 1000 can be made based on pre-established preferences that can be stored in, for example, a registration database or other similar construct.

Figure 11:
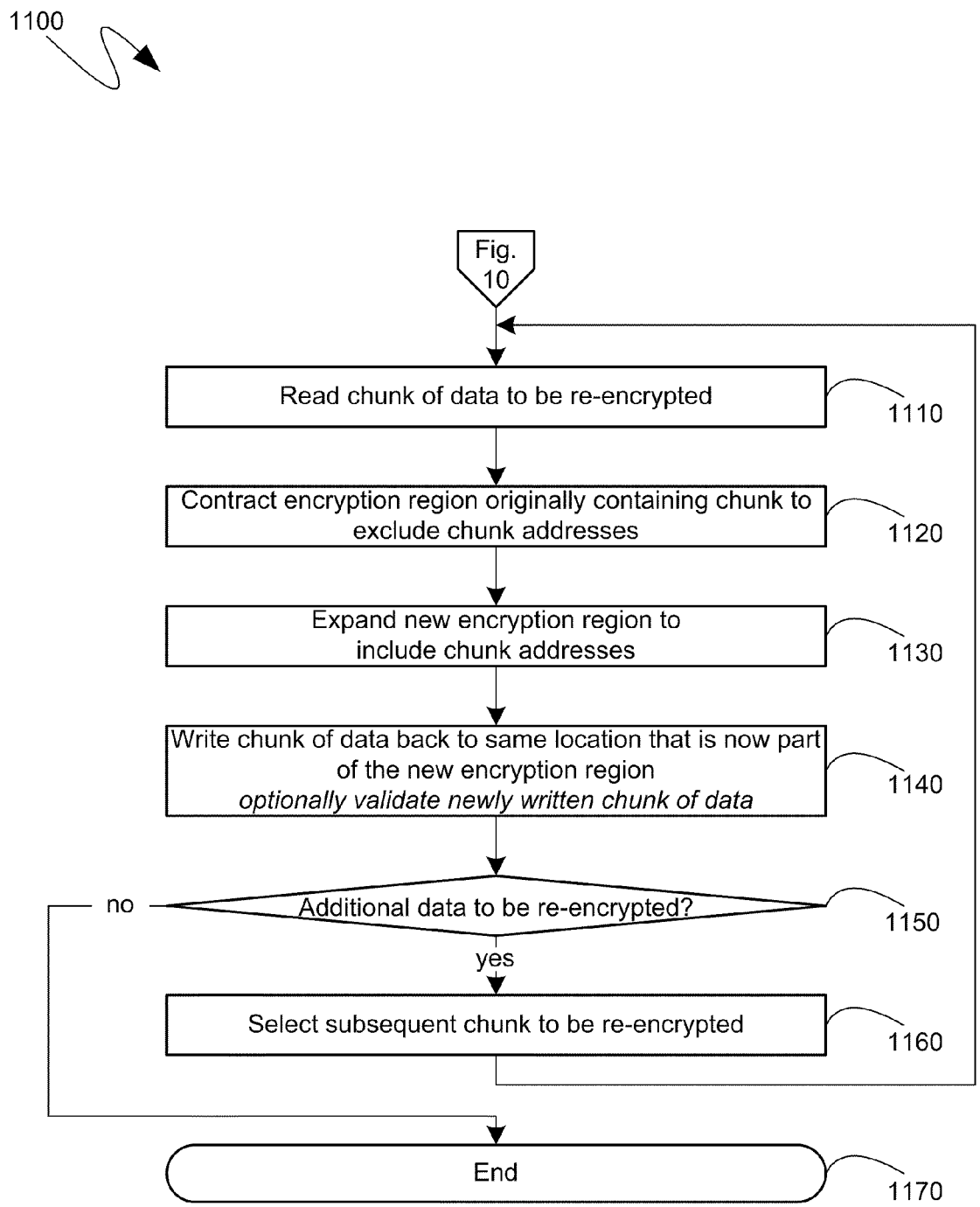
FIG. 11 is a flow diagram of an exemplary offline, in-place re-encryption of data.

Turning to FIG. 11, if, based on the decisions of the flow diagram 1000 of FIG. 10, it is determined that an in-place, offline, not fault tolerant re-encryption is to be performed, then processing can proceed with the steps of the flow diagram 1100 of FIG. 11. As will be recognized by those skilled in the art, the storage device need not actually be "offline", but rather executing processes on the computing device 100 shown in FIG. 1, such as the cryptographic management 161, also shown in FIG. 1, can simply make a storage device appear to be "offline" and unavailable for read or write requests from other computer-executable instructions executing on such a computing device. Consequently, the flow diagrams described below can comprise steps that can be performed by computer-executable instructions executing on the computing device 100 of FIG. 1, such as, for example, the cryptographic management 161, even though the storage device is indicated as nominally being "offline". Turning to FIG. 11, initially, at step 1110, a chunk of data to be re-encrypted can be read from a storage medium. Subsequently, at step 1120, the encryption region originally containing the chunk can be contracted so as to no longer include the addresses of, or otherwise the location of, the chunk of data that was read at step 1110. At step 1130 a replacement encryption region can be expanded to include those addresses. Subsequently, at step 1140 the chunk of data read at step 1110 can be written back to the same location, such as the same addresses, at which it was previously stored except that, as indicated, that location can now be part of the replacement encryption region. As an optional component of step 1140 the data of the chunk can be validated, or otherwise verified to ensure that the writing of the chunk of data at step 1140 had been performed without error.

At step 1150, a determination can be made as to whether additional data remains to be re-encrypted. For example, such a determination can reference the encryption region that was contracted at step 1120 to determine whether the size of that encryption region is now zero. If the size of the existing encryption region is not zero, or it is otherwise determined, at step 1150, that additional data remains to be re-encrypted, a subsequent chunk of data to be re-encrypted can be selected at step 1160 and processing can then return to step 1110 and repeat the above described steps. Alternatively, however, if, at step 1150, it is determined that no additional data remains to be re-encrypted, the re-encryption process can end at step 1170, as shown.

Figure 12:
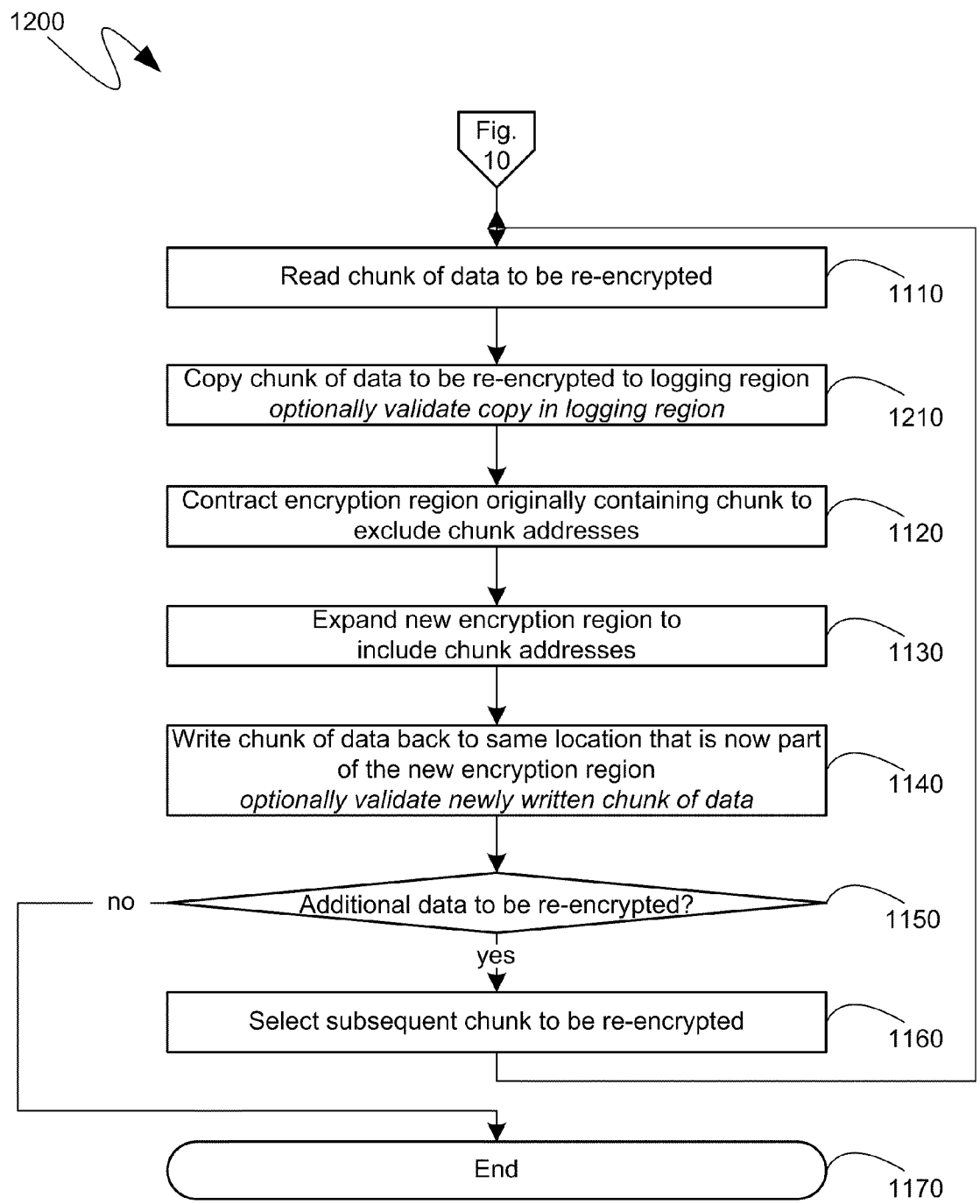
FIG. 12 is a flow diagram of an exemplary fault-tolerant, offline, in-place re-encryption of data.

Turning to FIG. 12, if, based on the decisions of the flow diagram 1000 of FIG. 10, it is determined that an in-place, offline, fault tolerant re-encryption is to be performed, then processing can proceed with the steps of the flow diagram 1200 of FIG. 12. In the flow diagram 1200 of FIG. 12, the steps that are identical to those described above with reference to the flow diagram 1100 of FIG. 11 retain their same numeric identifiers and their descriptions, for the sake of brevity, are not repeated again. As can be seen from the flow diagram 1200, the re-encryption described in detail below with reference to the flow diagram 1100 of FIG. 11 can be made fault tolerant by the addition of step 1210, which can be inserted between steps 1110 and 1120. More specifically, after the chunk of data to be re-encrypted has been read at step 1110, it can be copied to a logging location at step 1210. As an optional component of step 1210, the copy of the chunk in the logging location can be validated, or otherwise verified, to insure that the copy to the location has been performed without error. As described in detail previously, the writing of data to the logging location at step 1210 can be performed using write-through caching semantics, or other mechanisms to ensure that the writing of data to the logging location is being performed in a non-volatile manner.

Figure 13:
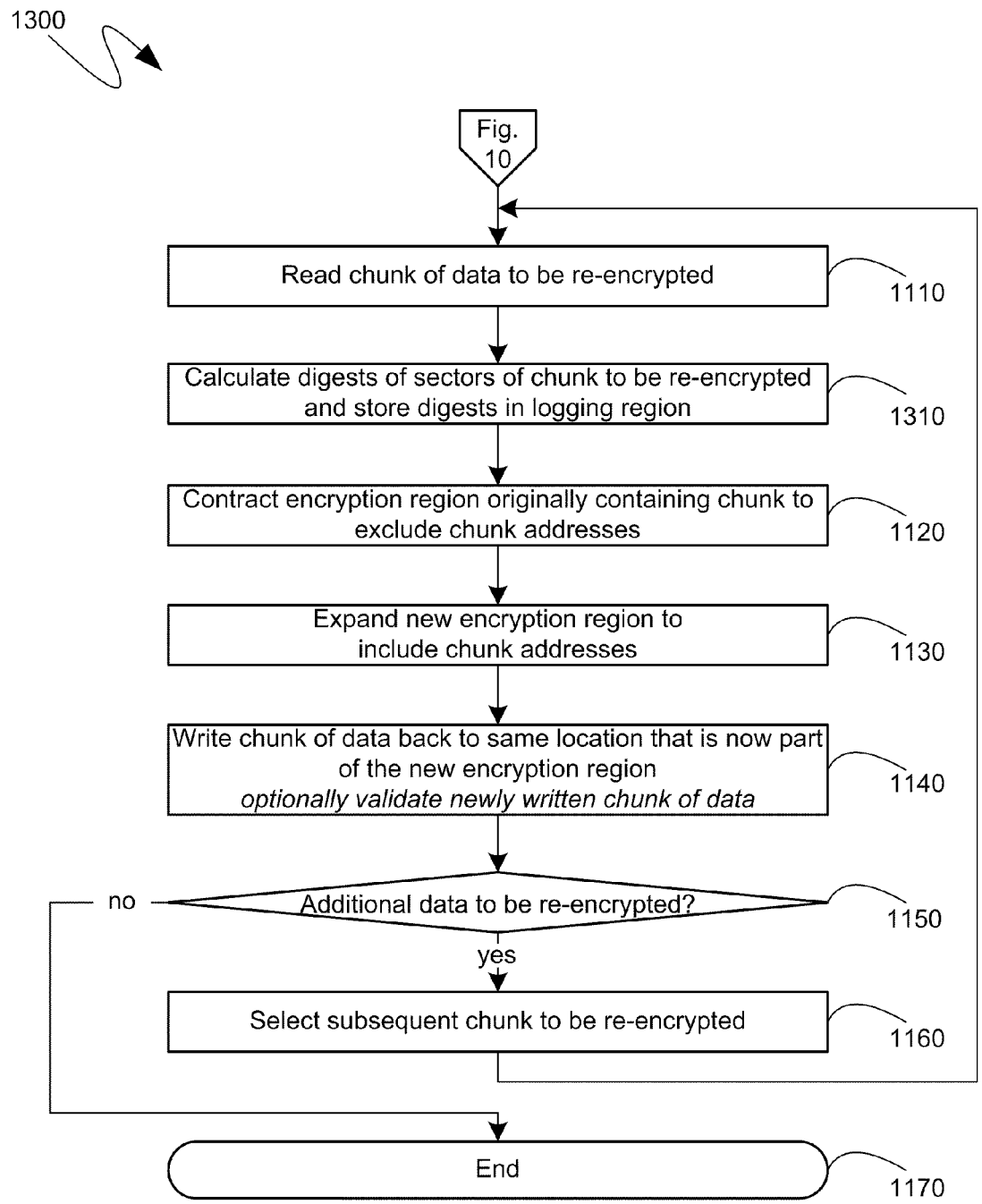
FIG. 13 is a flow diagram of another exemplary fault-tolerant, offline, in-place re-encryption of data.

Turning to FIG. 13, if, based on the decisions of the flow diagram 1000 of FIG. 10, it is determined that an in-place, offline, fault tolerant re-encryption is to be performed, and then optimization based on the utilization of digests is to be utilized in implementing the fault tolerance, then processing can proceed with the steps of the flow diagram 1300 of FIG. 13. As before, the steps that are identical to those described above with reference to previously described flow diagrams retain their same numeric identifiers and their descriptions, for the sake of brevity, are not repeated again. In the flow diagram 1300 of FIG. 13, after the chunk of data to be re-encrypted has been read at step 1110, instead of copying it to a logging location as in step 1210, instead digests of sectors of the chunk, or other quanta of the chunk, are computed and stored in the logging location at step 1310. Processing can then proceed in the manner already described in detail.

Figure 14:
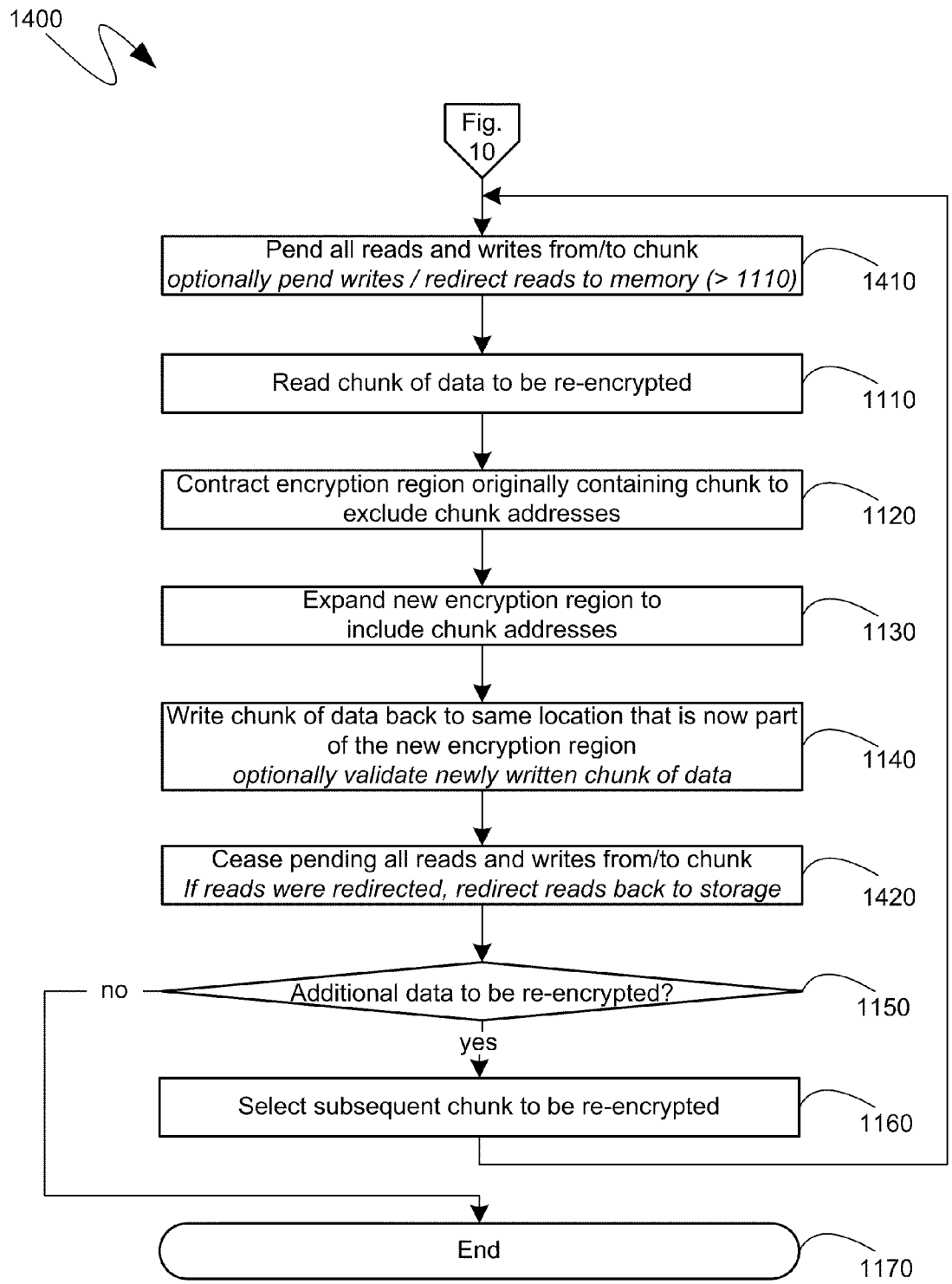
FIG. 14 is a flow diagram of an exemplary online, in-place re-encryption of data

Turning to FIG. 14, if, based on the decisions of the flow diagram 1000 of FIG. 10, it is determined that an in-place, online, not fault tolerant re-encryption is to be performed, then processing can proceed with the steps of the flow diagram 1400 of FIG. 14. As before, the steps that are identical to those described above with reference to previously described flow diagrams retain their same numeric identifiers and their descriptions, for the sake of brevity, are not repeated again. Initially, prior to the previously described step 1110, at which a chunk of data to be re-encrypted is read, all reads and writes from and to that chunk can be pended at step 1410. Optionally, rather than pending both the reads from the chunk and the writes to the chunk, only the writes to the chunk can be pended, and the reads can be redirected to the memory location at which the chunk is read at the subsequent step 1110. Although such an optional redirecting of the reads is shown as part of step 1410, it would likely be performed after step 1110 since, as will be known by those skilled in the art, the memory location to which the data of the chunk is read at step 1110 may not be known until after the completion of said step. The parenthetical "(>1110)" of step 1410 is meant to convey that the redirection to memory likely occurs after step 1110. Subsequently, the reads and writes that were pended at step 1410 can, at step 1420, be allowed, and future pending of reads and writes directed to the chunk can be ceased, as shown. Again, optionally, if the reads were redirected to the chunk, as retained in memory, such a redirection can be ceased at step 1420 and the reads can be returned back to reading data from the storage location of the chunk.

Figure 15:
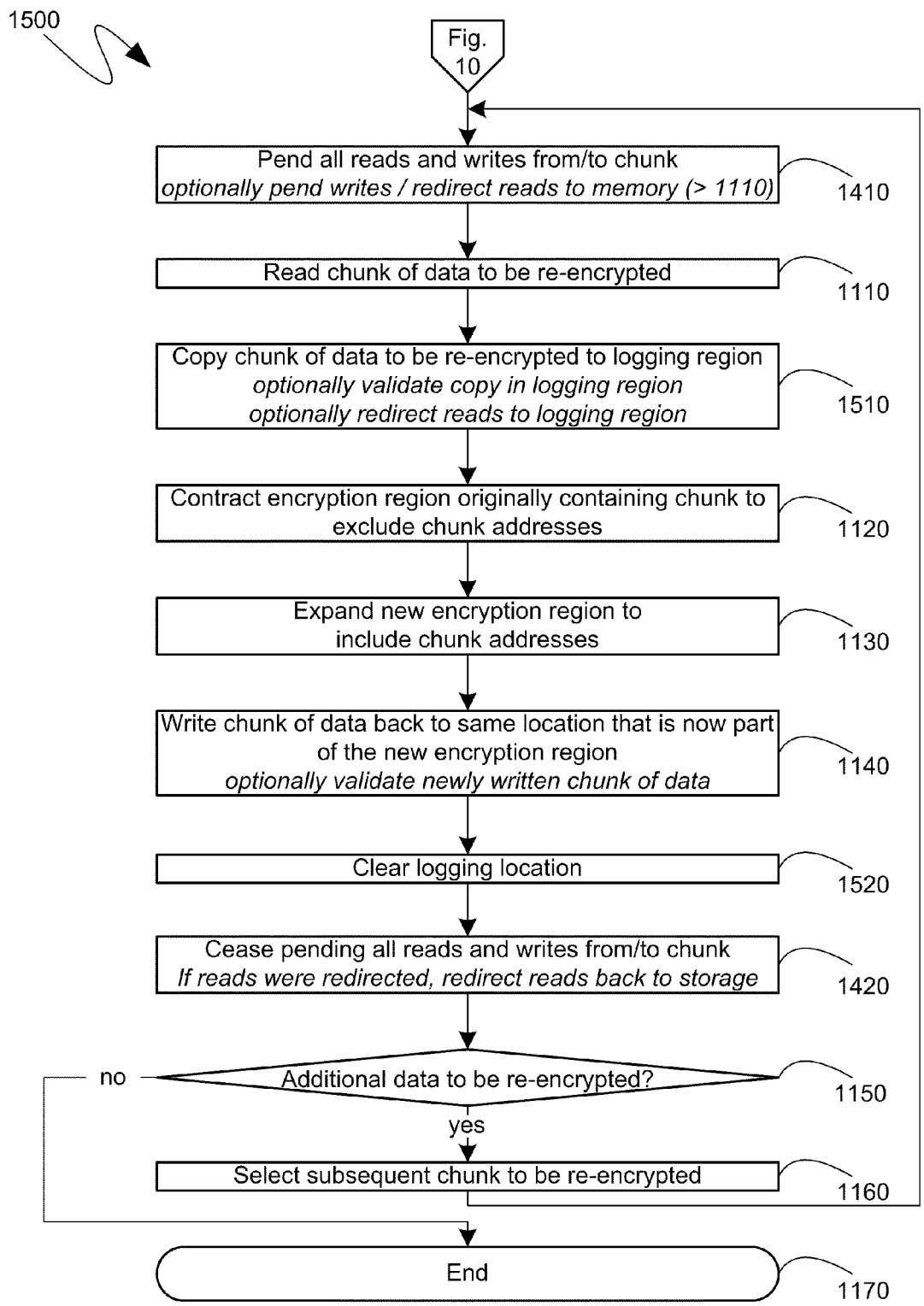
FIG. 15 is a flow diagram of an exemplary fault-tolerant, online, in-place re-encryption of data.

Turning to FIG. 15, if, based on the decisions of the flow diagram 1000 of FIG. 10, it is determined that an in-place, online, fault tolerant re-encryption is to be performed, then processing can proceed with the steps of the flow diagram 1500 of FIG. 15. As before, the steps that are identical to those described above with reference to previously described flow diagrams retain their same numeric identifiers and their descriptions, for the sake of brevity, are not repeated again. As shown in the flow diagram 1500 of FIG. 15, after the chunk of data to be re-encrypted has been read at step 1110, it can be copied to the logging location at step 1510. Step 1510 can differ from the previously described step 1210, described with reference to FIG. 12, in that, as an optional component of step 1510, not only can the copy be validated, as described previously, but also the reads that were redirected to memory as an optional component of step 1410 can, instead, be redirected to the logging location, as an optional component of step 1510. The remaining steps of the flow diagram 1500 of FIG. 5 have all been described, individually, in detail above, except that, after the chunk of data has been written back to its original location, which is part of the replacement encryption region, at step 1140, the logging location can be cleared, at step 1520, for the reasons described in detail above.

Figure 16:
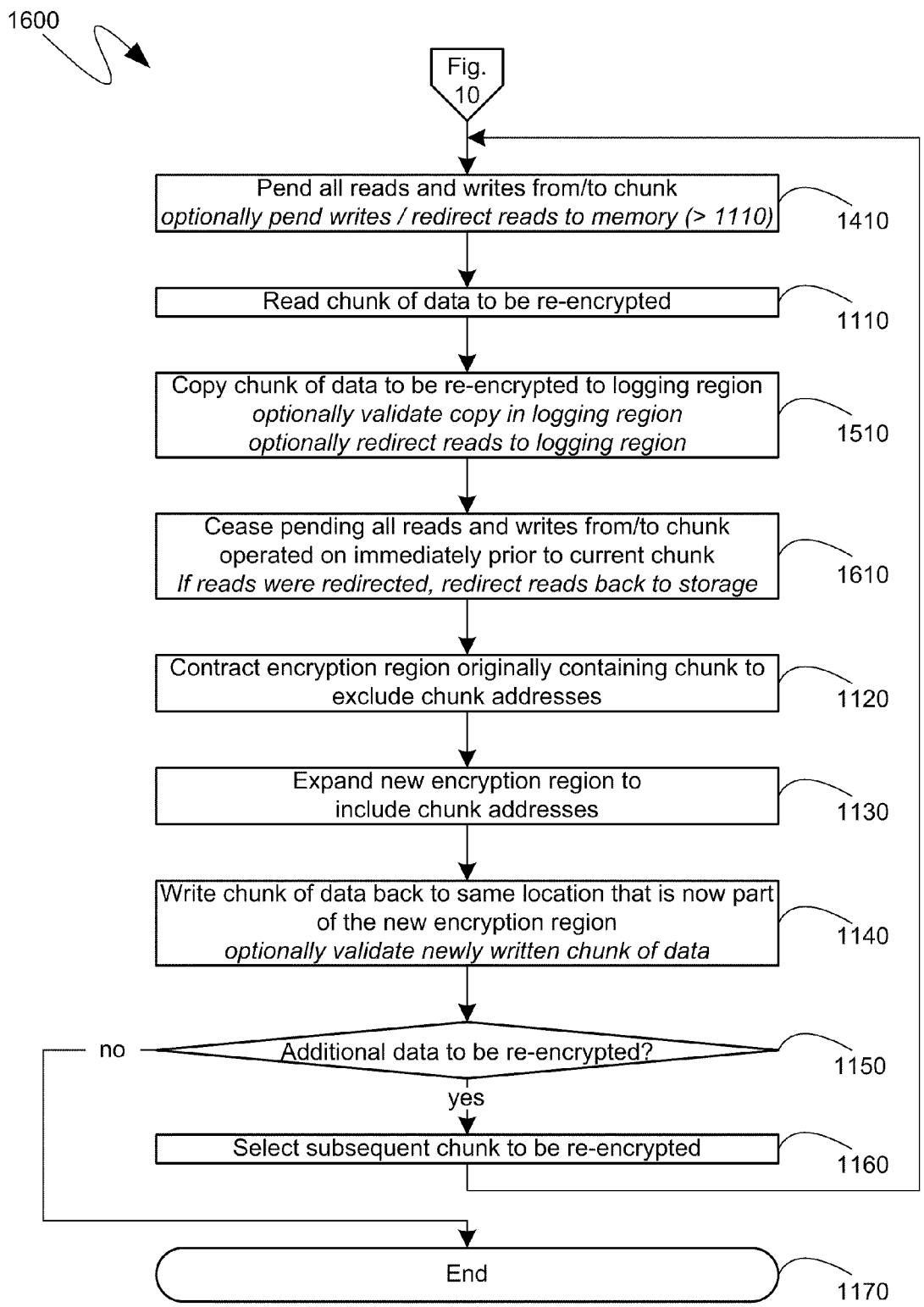
FIG. 16 is a flow diagram of another exemplary fault-tolerant, online, in-place re-encryption of data.

Turning to FIG. 16, if, based on the decisions of the flow diagram 1000 of FIG. 10, it is determined that an in-place, online, fault tolerant re-encryption is to be performed, and that the fault tolerance is to be optimized by skipping the explicit clearing step of the logging location, then processing can proceed with the steps of the flow diagram 1600 of FIG. 16. As before, the steps that are identical to those described above with reference to previously described flow diagrams retain their same numeric identifiers and their descriptions, for the sake of brevity, are not repeated again. As can be seen from the flow diagram 1600 of FIG. 16, the reads and writes, or, optionally, at least the writes, to the chunk of data being read encrypted can be pended at step 1410, as described previously. However, such pending, or redirection, is not lifted after step 1140, as previously, but instead remains through an additional cycle until step 1610 is reached. At step 1610, all of the pending reads and writes directed to the immediately previously re-encrypted chunk can be ceased. Optionally, if only the writes were pended, and the reads were redirected, then such a redirection of the reads can be ceased at step 1610. In such a manner, the explicit clearing of the logging location, previously described as step 1210, need not be a component of the flow diagram 1600 of FIG. 16. As will be recognized by those skilled in the art, because step 1610 applies to the previously re-encrypted chunk, when, at step 1150, it is determined that no additional data remains to be re-encrypted, before ending at step 1170, processing can revisit step 1610 to ensure that the reads and writes to the last chunk are stopped. For ease of visual presentation, such a final step is not explicitly shown in the flow diagram 1600 of FIG. 16.

Figure 17:
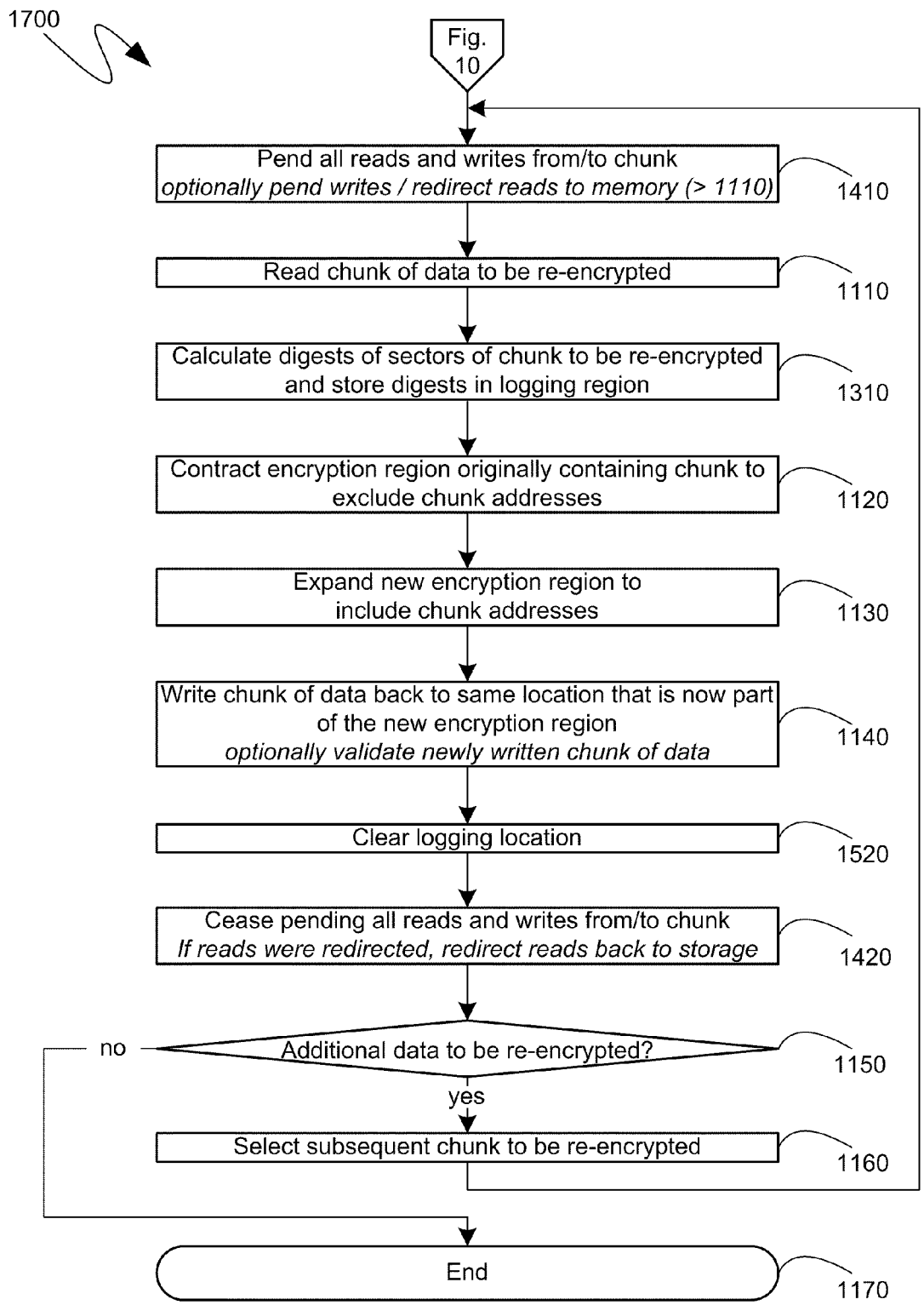
FIG. 17 is a flow diagram of yet another exemplary fault-tolerant, online, in-place re-encryption of data.

Turning to FIG. 17, if, based on the decisions of the flow diagram 1000 of FIG. 10, it is determined that an in-place, online, fault tolerant re-encryption is to be performed, and that the fault tolerance is to be optimized by utilizing digests, then processing can proceed with the steps of the flow diagram 1700 of FIG. 17. While, as before, the steps that are identical to those described above with reference to previously described flow diagrams retain their same numeric identifiers and their descriptions, for the sake of brevity, are not repeated again, the flow diagram 1700 of FIG. 17 comprises no steps not previously described. Instead as can be seen, the flow diagram 1700 of FIG. 17 is, essentially, an amalgamation of the flow diagram 1300 of FIG. 13 and the flow diagram 1400 of FIG. 14 and is, therefore, entirely based on steps that have already been previously described in detail.

Figure 18:
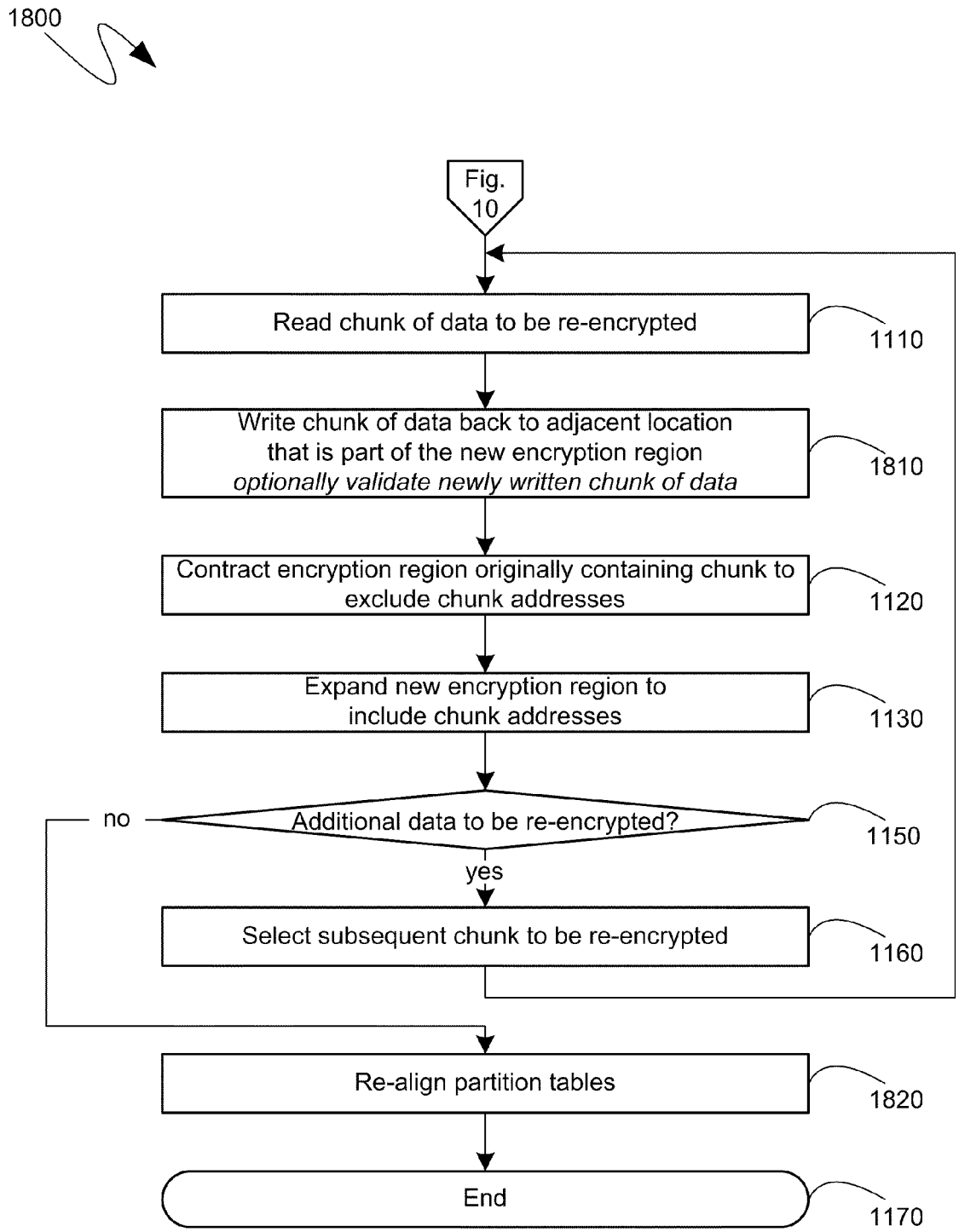
FIG. 18 is a flow diagram of an exemplary offline, out-of-place re-encryption of data.

Turning to FIG. 18 if, based on the decisions of the flow diagram 1000 of FIG. 10, it is determined that an out-of-place, offline re-encryption is to be performed, then processing can proceed with the steps of the flow diagram 1800 of FIG. 18. In one embodiment, as indicated previously, in order for an out-of-place re-encryption to be performed, a gap can have been established between encryption regions, such as during an initialization of the storage medium. In an alternative embodiment, however, such a gap can be created prior to the commencement of the re-encryption, in which case the flow diagram 1800 shown in FIG. 18, and the flow diagram 1900 shown in FIG. 19, can have additional steps at the beginning of those flow diagrams, not explicitly illustrated, to create such a gap. More specifically, if the cryptographic management 161, shown in FIG. 1, operates below a partition manager, a partition table can be updated just once at the end of the re-encryption process and the reads and writes can be redirected to chunks after they are written in the encryption region B 241, as shown in FIG. 9, and as described in detail above. Conversely, if the cryptographic management 161, shown in FIG. 1, operates above a partition manager, then the encryption region B 241, shown in FIG. 9, can be extended before the re-encryption process and shrunk after the re-encryption process. In such an embodiment, an explicit gap-creation step can be part of the flow diagrams 1800 of FIG. 18 and 1900 of FIG. 19 and, in such an embodiment, as indicated previously, the reads and writes to the encryption region A 261, shown in FIG. 9, can be shifted, while those of the encryption region B 241, also shown in FIG. 9, remain unshifted. Turning back to the flow diagram 1800 of FIG. 18, as before, the steps that are identical to those described above with reference to previously described flow diagrams retain their same numeric identifiers and their descriptions, for the sake of brevity, are not repeated again. In the flow diagram 1800 of FIG. 18, after the chunk of data to be re-encrypted is read at step 1110, it can, at step 1810, be written back to the storage medium in a location that is adjacent to the location from which it was read at step 1110, but which is part of the replacement encryption region. As an optional component of step 1810, the copy of the chunk of data that was written back to the replacement encryption region can be validated, or otherwise verified, to ensure that the copy process completed successfully and without error. It is only after the chunk of data has already been re-encrypted, by virtue of being written back into a location that is part of the replacement encryption region, at step 1810, that processing can proceed with steps 1120 and 1130, described in detail above. After completing the re-encryption, such as can be determined at step 1150 when it is found that no additional data to be re-encrypted remains, the partition tables, or other table or database that maintains addressing information, can be re-aligned in accordance with the new locations of the re-encrypted data which, as explained previously, can, as a result of the writing, at step 1810, to a location adjacent to its prior location, be "shifted". The realigning, at step 1820, can account for such a "shift".

Figure 19:
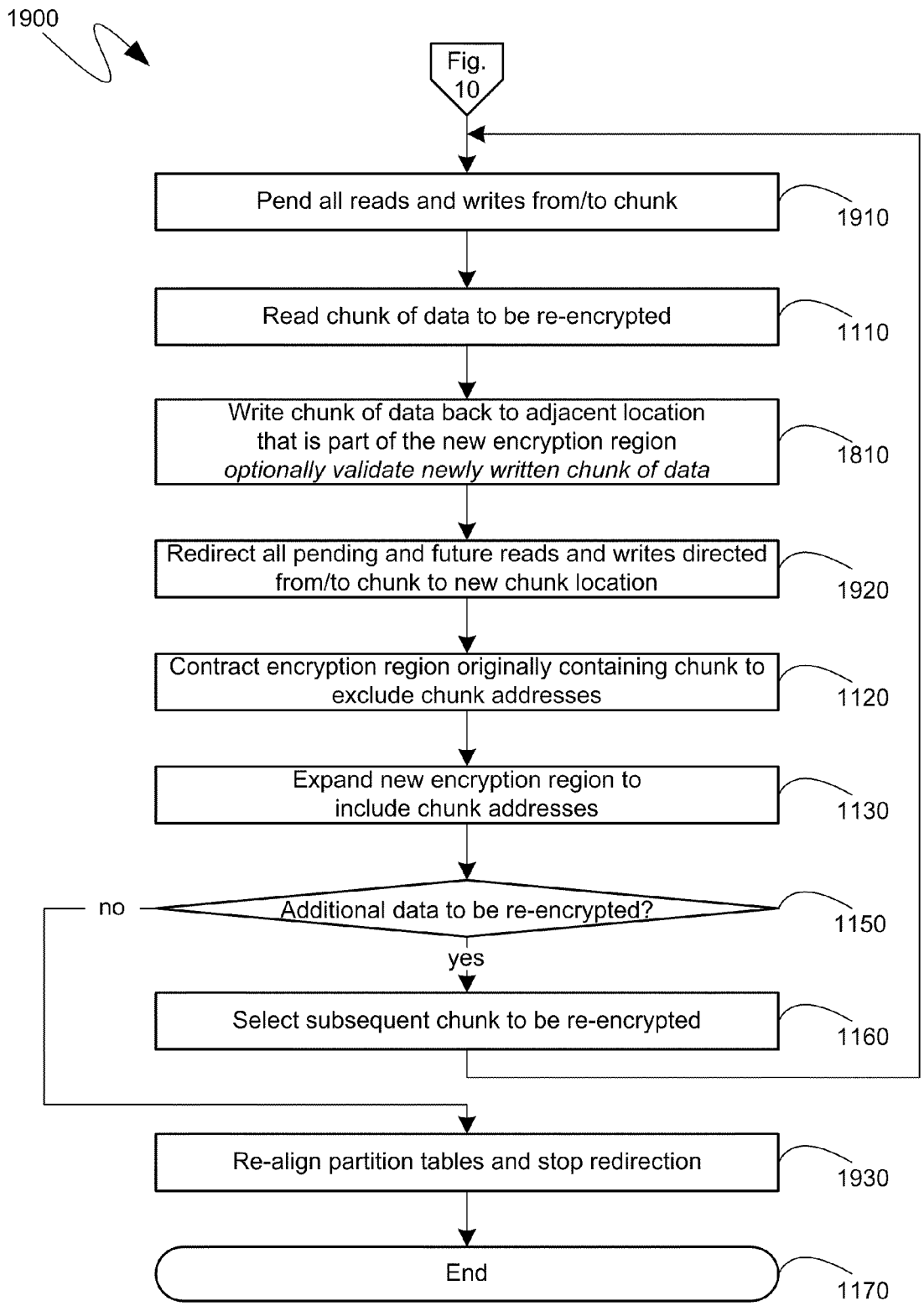
FIG. 19 is a flow diagram of an exemplary online, out-of-place re-encryption of data.

Turning to FIG. 19 if, based on the decisions of the flow diagram 1000 of FIG. 10, it is determined that an out-of-place, online re-encryption is to be performed, then processing can proceed with the steps of the flow diagram 1900 of FIG. 19. As before, the steps that are identical to those described above with reference to previously described flow diagrams retain their same numeric identifiers and their descriptions, for the sake of brevity, are not repeated again. In the flow diagram 1900 of FIG. 19, prior to the reading of the chunk of data to be re-encrypted, at step 1110, the reads and writes to that chunk can be pended at step 1910. Step 1910 can differ from step 1410, described in detail previously, in that, at step 1910, there may not exist an option to pend only the writes to the chunk and redirect the reads to an in-memory copy. Instead, because the chunk of data, read at step 1110, is written right back the storage medium, at step 1810, there is no need to redirect the reads to memory, as they can be redirected to the new, re-encrypted chunk. Thus, as shown in the flow diagram 1900 of FIG. 19, at step 1920, the pending of the reads and writes from step 1910 can be lifted, and all the pending and future reads and writes directed from/to that chunk can be redirected to the replacement location of the re-encrypted chunk that was stored in the replacement location at step 1810. Processing can then proceed with the steps illustrated, each of which was described in detail above. At step 1930, prior to ending, at step 1170, the partition tables can be re-aligned in the same manner as in step 1820, which was described previously. In addition to re-aligning the partition tables as in step 1820, however, step 1930 can further comprise the ceasing, after such re-alignment, of any redirections that can have been implemented at step 1920 since, as will be recognized by those skilled in the art, such redirections would no longer be valid after the re-aligning. Processing can then end at step 1170, as shown.

As can be seen from the above descriptions, a re-encryption mechanism that can utilize independent encryption agents has been provided. In view of the many possible variations of the subject matter described herein, we claim as our invention all such embodiments as may come within the scope of the following claims and equivalents thereto.

We claim:

1. One or more computer-readable memory comprising computer-executable instructions for re-encrypting a set of data, the computer-executable instructions directed to steps comprising:
    reading a first chunk of data from a first storage location where the first chunk of data was stored, the first storage location being within a first encryption region during the reading, wherein data written to the first encryption region is encrypted with reference to a first cryptographic key prior to being stored in the first encryption region and data read from the first encryption region is decrypted with reference to the first cryptographic key after being read from the first encryption region;
    writing the first chunk of data into a second storage location where the first chunk of data will be stored for subsequent access, the second storage location differing from the first storage location, the second storage location being within a second encryption region during the writing, wherein data written to the second encryption region is encrypted with reference to a second cryptographic key prior to being stored in the second encryption region and data read from the second encryption region is decrypted with reference to the second cryptographic key after being read from the second encryption region, the second cryptographic key differing from the first cryptographic key;
    contracting the first encryption region to no longer include the first storage location;
    expanding the second encryption region to accommodate a second chunk of data, different from the first chunk of data, the expanding being performed after the writing of the first chunk of data into the second storage location within the second encryption region; and
    repeating the reading, the writing, the contracting and the expanding with successive chunks of data.

2. The computer-readable memory of claim 1, wherein the expanding expands the second encryption region to now include the first storage location of the first chunk of data.

3. The computer-readable memory of claim 1, comprising further computer-executable instructions directed to: writing the first chunk of data into a logging location to provide tolerance for faults experienced during the re-encryption of the set of data.

4. The computer-readable memory of claim 1, comprising further computer-executable instructions directed to: calculating digests of at least some sectors of the first chunk of data; and writing the calculated digests into a logging location in to provide tolerance for faults experienced during the re-encryption of the set of data.

5. The computer-readable memory of claim 1, comprising further computer-executable instructions directed to: checking, prior to initiating the re-encryption of the set of data, for a logging location; and, if the logging location exists, commencing recovery from a fault-terminated prior re-encryption of the set of data.

6. The computer-readable memory of claim 5, comprising computer-executable instructions for recovering from the fault-terminated prior re-encryption, the computer-executable instructions for recovering being directed to:
    determining whether the first encryption region and the second encryption region are adjacent;
    restarting the re-encryption with the expanding if the first encryption region and the second encryption region are not adjacent;
    determining, if the first encryption region and the second encryption region are adjacent, whether contents of the logging location point to and match the first chunk of data in the first encryption region or point to and match the first chunk of data as written into the second encryption region;

restarting the re-encryption with the contracting and the expanding if the first encryption region and the second encryption region are adjacent and if the contents of the logging location point to and match the first chunk of data in the first encryption region;

restarting the re-encryption with the reading, the writing, the contracting and the expanding if the first encryption region and the second encryption region are adjacent and if the contents of the logging location point to but do not match the first chunk of data in the first encryption region or the contents of the logging location fail verification;

restarting the re-encryption with a clearing the logging location, followed by the repeating, if the first encryption region and the second encryption region are adjacent and if the contents of the logging location point to and match the first chunk of data as written into the second encryption region; restarting the re-encryption with the writing, followed by the repeating, if the first encryption region and the second encryption region are adjacent and if the contents of the logging location point to but do not match the first chunk of data as written into the second encryption region; and restarting the re-encryption with the repeating if the first encryption region and the second encryption region are adjacent and if the contents of the logging location have been cleared.

7. The computer-readable memory of claim 1, comprising further computer-executable instructions directed to: pending reads and writes that are directed to the first chunk of data in the first encryption region prior to the reading and the writing; and ceasing the pending after the writing.

8. The computer-readable memory of claim 7, comprising further computer-executable instructions directed to: writing the first chunk of data into a logging location in the first encryption region to provide tolerance for faults experienced during the re-encryption of the set of data; and redirecting the pended reads to the first chunk of data in the logging location.

9. The computer-readable memory of claim 1, comprising further computer-executable instructions directed to: re-aligning partition tables to account for a shift in data locations between the first storage location and the second storage location.

10. The computer-readable memory of claim 1, comprising further computer-executable instructions directed to: pending reads and writes that are directed to the first chunk of data in the first encryption region prior to the reading and the writing; ceasing the pending after the writing; and adjusting reads and writes to account for a shift in data locations between the first storage location and the second storage location.

11. The computer-readable memory of claim 1, comprising further computer-executable instructions directed to: creating at least two partitions such that a gap exists between the at least two partitions, the gap being at least as large as the first chunk of data.

12. The computer-readable memory of claim 1, wherein a size of the first chunk of data is increased if the re-encryption is to be performed more quickly and is decreased if input/output throughput of the set of data is to be increased.

13. The computer-readable memory of claim 1, wherein the contracting is performed after both the reading and the writing.

14. A method of re-encrypting a set of data on a self-encrypting storage device, the method comprising the steps of:

reading a first chunk of data from a first storage location within a first encryption region of the self-encrypting storage device, wherein the self-encrypting storage device encrypts data, provided to it for storage within the first encryption region, with reference to a first cryptographic key and decrypts data, requested from the first encryption region, with reference to the first cryptographic key;

writing the first chunk of data into a second storage location, the second storage location differing from the first storage location, the second storage location being within a second encryption region of the self-encrypting storage device, wherein the self-encrypting storage device encrypts data, provided to it for storage within the second encryption region, with reference to a second cryptographic key and decrypts data, requested from the second encryption region, with reference to the second cryptographic key, the second cryptographic key differing from the first cryptographic key;

instructing the self-encrypting storage device to contract the first encryption region to no longer include the first storage location;

instructing the self-encrypting storage device to expand the second encryption region to accommodate a second chunk of data, differing from the first chunk of data, the instructing the self-encrypting storage device to expand the second encryption region being performed after the writing of first chunk of data into second storage location within the second encryption region; and repeating the reading, the writing, the instructing the contracting and the instructing the expanding with successive chunks of data.

15. The method of claim 14, wherein the expanding expands the second encryption region to now include the first storage location of the first chunk of data.

16. The method of claim 14, further comprising the steps of: re-aligning partition tables to account for a shift in data locations between the first storage location and the second storage location.

17. The method of claim 14, further comprising the steps of: partitioning the self-encrypting storage device into at least two partitions such that a gap exists between the at least two partitions, the gap being at least as large as the first chunk of data.

18. A computing system comprising:

at least one storage device comprising a set of data stored thereon;

at least one independent cryptographic agent communicationally coupled to the at least one storage device, the at least one independent cryptographic agent performing steps comprising: encrypting data prior to storage on the at least one storage device and decrypting data after being read from the at least one storage device, both being performed with reference to cryptographic keys associated with encryption regions such that data in a first encryption region is encrypted and decrypted with reference to a first cryptographic key and data in a second encryption region is encrypted and decrypted with reference to a second cryptographic key, the first and second cryptographic keys being different and independent of one another; and at least one computing device communicationally coupled to the at least one independent cryptographic agent, the at least one computing device executing computer-executable instructions for utilizing the at least one independent cryptographic agent to perform a re-encryption of the set of data stored on the at least one storage device, the computer-executable instructions directed to steps comprising:

reading a first chunk of data from a first storage location in the first encryption region;

writing the first chunk of data into a second storage location, differing from the first storage location, the second storage location being within the second encryption region;

contracting the first encryption region to no longer include the first storage location;

expanding the second encryption region to accommodate a second chunk of data, differing from the first chunk of data, the expanding being performed after the writing of the first chunk of data into the second storage location within the second encryption region; and repeating the reading, the writing, the contracting and the expanding with successive chunks of data.

19. The computing system of claim 18, wherein the expanding expands the second encryption region to now include the first storage location of the first chunk of data.

20. The computing system of claim 18, wherein the at least one computing device executes further computer-executable instructions for: re-aligning partition tables to account for a shift in data locations between the first storage location and the second storage location.

* * * * *